United States Patent [19]
Ichikawa et al.

[11] Patent Number: 5,387,094
[45] Date of Patent: Feb. 7, 1995

[54] TIRE VULCANIZING PRESS

[75] Inventors: Katsumi Ichikawa; Kashiro Ureshino, both of Kobe, Japan

[73] Assignee: Kabushiki Kaisha Kobeseikosho, Kobe, Japan

[21] Appl. No.: 150,065

[22] PCT Filed: Mar. 24, 1993

[86] PCT No.: PCT/JP93/00341
§ 371 Date: Mar. 22, 1993
§ 102(e) Date: Nov. 22, 1993

[87] PCT Pub. No.: WO93/18903
PCT Pub. Date: Sep. 30, 1993

[22] Filed: Nov. 22, 1993

[30] Foreign Application Priority Data

Mar. 24, 1992 [JP] Japan .................................. 4-98716
Aug. 10, 1992 [JP] Japan .................................. 4-213064
Sep. 30, 1992 [JP] Japan .................................. 4-262072

[51] Int. Cl.[6] ........................ B29C 33/22; B30B 15/04
[52] U.S. Cl. ................................. 425/34.1; 100/214; 425/47; 425/451.9
[58] Field of Search ....................... 425/28.1, 34.1, 47, 425/451.9; 100/214

[56] References Cited

U.S. PATENT DOCUMENTS

| | | | |
|---|---|---|---|
| 3,783,775 | 1/1974 | Von Platen et al. | 100/214 |
| 4,105,379 | 8/1978 | Gazuit | 425/47 |
| 4,129,406 | 12/1978 | Capecchi | 425/47 |
| 4,391,769 | 7/1983 | Ichikawa et al. | |
| 4,610,618 | 9/1986 | Schmidts et al. | 425/383 |
| 4,702,669 | 10/1987 | Ichikawa et al. | |
| 4,834,636 | 5/1989 | Ichikawa et al. | |
| 4,874,303 | 10/1989 | Ichikawa et al. | |
| 5,015,165 | 5/1991 | Ozaki et al. | 425/47 |

FOREIGN PATENT DOCUMENTS

| | | |
|---|---|---|
| 0037703 | 10/1981 | European Pat. Off. . |
| 0050520 | 4/1982 | European Pat. Off. . |
| 0459375 | 12/1991 | European Pat. Off. . |
| 2460731 | 7/1976 | Germany . |
| 58-71143 | 4/1983 | Japan . |
| 62-267100 | 11/1987 | Japan . |
| 2-127409 | 10/1990 | Japan . |

OTHER PUBLICATIONS

Patent Abstracts of Japan, vol. 12, No. 145 (M-693)(2992), May 6, 1988.

Primary Examiner—James P. Mackey
Attorney, Agent, or Firm—Oblon, Spivak, McClelland, Maier & Neustadt

[57] ABSTRACT

A tire vulcanizing press is provided, which is of high accuracy, eliminates the adjustment for a guide member, and reduces the area to be machined. The tire vulcanizing press comprises a main body frame including a lower frame, and at least one side frame erected on the lower frame; a lower mold mounting member mounted on the lower frame for fixing a lower mold; an upper mold mounting member for fixing an upper mold in surface-contact with the lower mold; a guide member disposed on one side of the upper mold mounting member for supporting the upper mold mounting member on the side frame in a cantilever state, and which travels to be lifted/lowered; and a drive body for freely vertically lifting/lowering the upper mold mounting member relatively to the lower mold mounting member by traveling of the guide member. The guide member includes rail bases having a plurality of rail grooves and extending in the vertical direction, and moving bases incorporated with a plurality of ball rows rotating around their axes while revolving within the rail grooves of the rail bases.

7 Claims, 23 Drawing Sheets

TIRE VULCANIZING PRESS

TECHNICAL FIELD

The present invention relates to a tire vulcanizing press.

BACKGROUND ART

Conventionally, as the tire vulcanizing press of this type, there has been known such a press as shown in FIG. 22 and FIG. 23 (taken along the arrow D in FIG. 22).

In FIGS. 22 and 23, a main body frame 21 of this tire vulcanizing press includes an upper frame 21a, a lower frame 21b and two side frames 21c and 21d. A lower mold 23 is fixed on the lower frame 21b through a lower mold mounting member 22. An upper mold 24, which is intended to be surface-contacted with the lower mold 23 and to be freely opened/closed, is fixed on an upper mold mounting member 25. The end portions of piston rods 27 of two liftable cylinders 26 provided on side portions of the upper frame 21a are fixed on the upper mold mounting member 25. Guide members 28 are disposed between both side portions 25a and 25b of the upper mold mounting member 25 and both the side frames 21c and 21d, respectively. The guide members 28 include rails 29 mounted on the side frames 21c and 21d, and rollers 30 mounted on the side portions 25a and 25b of the upper mold mounting member 25. By traveling of the rollers 30 along the traveling surfaces 29a of the rails 29 which are mechanically finished with high accuracy, the upper mold mounting member 25 is vertically liftable with respect to the lower mold mounting member 22. Further, a pressure transmitting rod 31 is erected on the upper mold mounting member 25, and the upper portion of the pressure transmitting rod 31 is inserted in a hollow pressure cylinder 32 fixed on the upper frame 21a.

Next, the operation of the above tire vulcanizing pressure will be described.

The upper mold mounting member 25 is lifted by contracting the piston rod 27 of the liftable cylinder 26, to lift the upper mold 24. A green tire is thus set to be charged in the lower mold 23.

Then, the upper mold mounting member 25 is lowered by extending the piston rod 27 of the liftable cylinder 26, to lower the upper mold 24, thereby closing both the molds 23 and 24. Subsequently, the hollow pressure cylinder 32 is operated to transmit a pressure to the pressure transmitting rod 31, to perform the clamping operation.

After completion of the clamping operation, the piston rod 27 of the liftable cylinder 26 is contracted, to lift the upper mold mounting member 25. The tire thus vulcanized is discharged outside the apparatus by use of an unloader or the like. With this operation, the tire vulcanizing operation is completed, and a new green tire is set to be charged in the lower mold 23 by use of a loader or the like, to thus start the next vulcanizing operation.

In the tire vulcanizing press described in the prior art, the guide members 28 composed of the rollers 30 and the rails 29 are disposed at two points, that is, between both the side portions 25a and 25b of the upper mold mounting member 25 and both the side frames 21c and 21d, respectively.

As a result, it is required to adjust the parallelism between the guide members 28 disposed at two points; however, in the case of the tire vulcanizing press, this adjustment is difficult because of the thermal deformation due to the vulcanizing heat. Further, the upper mold mounting member 25 and the side frames 21c and 21d require large mounting areas for mounting the guide members 28. This causes a disadvantage in enlarging the areas to be machined, resulting in the increased cost.

Additionally, there is known such a tire vulcanizing press as disclosed in Unexamined Japanese Patent Publication SHO 58-71143.

In this tire vulcanizing press, a lower mold is fixed on the lower portion within a frame-like main body frame, and an upper mold is provided on the lower side of a liftable base (upper mold mounting member) liftably supported within the main body frame. On the other hand, a mold pressurizing apparatus is fixed on the upper portion of the main body frame, and a spacer which is intended to be interposed between the mold pressurizing apparatus and the liftable base at the lowering position is provided in such a manner as to be freely escaped sideward.

When the upper and lower molds are pressurized by the mold pressurizing apparatus, the spacer is interposed between the mold pressurizing apparatus and the liftable base. Besides, when the upper and lower molds are opened/closed, the liftable base is lifted/lowered while the spacer is escaped sideward.

Further, there is known the so-called twin type tire vulcanizing press, wherein two sets of vulcanizing mold apparatuses respectively provided with mold pressurizing apparatuses (clamping apparatuses) are juxtaposed in the lateral direction.

The prior art tire vulcanizing press requires a spacer having a length being nearly equivalent to the lifting/lowering stroke of the liftable base. This causes a disadvantage that the main body frame is made longer in the vertical direction, to thus enlarge the whole size of the vulcanizing apparatus.

Further, in the twin type tire vulcanizing press, during a molding cycle (15 min, at the present situation), the vulcanizing time (during clamping) is made longer, and the charging time of a green tire and the ejecting time of the tire (loading/unloading time) are made shorter. Consequently, it has been considered that the shearing of the clamping apparatus was unreasonable.

However, in the current tire vulcanizing press, the vulcanizing time has been made shorter, and in the future, the loading/unloading time may be made rather longer. In this case, the lowering of the operating efficiency of the clamping apparatus is at stake, and the cost-down is not expected.

DISCLOSURE OF THE INVENTION

Taking the above-described disadvantages in the prior art technique into consideration, the present invention has been made, and a first object of the present invention is to provide a tire vulcanizing press, which is of high accuracy, eliminates the adjustment for a guide member, and reduces areas to be machined.

A second object of the present invention is to provide a tire vulcanizing press capable of reducing the vertical length of a main body frame for miniaturizing the whole vulcanizing press.

To achieve the first object, the present invention provides the following means:

Namely, a tire vulcanizing press according to the present invention comprises:

a main body frame including a lower frame, and at least one side frame erected on the lower frame;

a lower mold mounting member mounted on the lower frame for fixing a lower mold;

an upper mold mounting member for fixing an upper mold in surface-contact with the lower mold;

a guide member disposed on one side of the upper mold mounting member for supporting the upper mold mounting member on the side frame in a cantilever state, and which travels to be lifted/lowered; and a drive body for freely vertically lifting/lowering the upper mold mounting member relatively to the lower mold mounting member by traveling of the guide member;

wherein the guide member includes rail bases having plurality of rail grooves and extending in the vertical direction, and moving bases incorporated with a plurality of ball rows rotating around their axes while revolving within the rail grooves of the rail bases.

Further, to achieve the second object, a tire vulcanizing press of the present invention further comprises a mold pressurizing apparatus for pressurizing the upper and lower molds and vertically provided together with the upper and lower mold mounting members, wherein the upper and lower mold mounting members, the upper and lower molds, and the mold pressurizing apparatus are provided within a frame-like pressurizing frame capable of being escaped for receiving the pressurizing reaction force.

Accordingly, in the tire vulcanizing press of the present invention, by use of the high rigidity and high accuracy guide member composed of the rail bases and moving bases, it is possible that the upper mold mounting member fixed with the upper mold is supported on the side frame in the cantilever state, and in the cantilever state, it is vertically lifted/lowered with respect to the lower mold mounting member fixed with the lower mold. As a result, the guide member is provided only on one side of the upper mold mounting member. This eliminates the adjustment, required in the prior art, for a parallelism between the guide members disposed in two points, that is, on both sides of the upper mold mounting member. Since the guide member is united in such a state that the rail bases and the moving bases are set with high accuracy, there is no adjustment for the moving bases and the rail bases. Further, since the mounting area for mounting the guide member on the upper mold mounting member and the side frame is reduced in half as compared with the prior art, the area to be machined is reduced in half, resulting in the extremely reduced cost. In addition, since only one of the two side frames is used, the remaining one can be used for a column of a vertical loader, and further, the press frame may be in the so-called C-type press frame including an upper frame, a lower frame and a side frame.

In addition to the above, the tire vulcanizing press of the present invention makes it possible to reduce the vertical length of the pressurizing frame, to reduce the size and the weight of the pressurizing frame, and to improve the failure resistance of the pressurizing frame and perform the safety and economical design.

Further, in the twin type vulcanizing press, the pressurizing frame is shared to be switchable in the removably engaging manner with respect to two sets of mold apparatuses, so that it is possible to improve operational efficiency of the mold pressurizing apparatus, resulting in the extreme cost-down.

BEST MODE FOR CARRYING OUT THE INVENTION

Hereinafter, embodiments of the present invention will be described with reference to the drawings. FIG.

Figure 1:
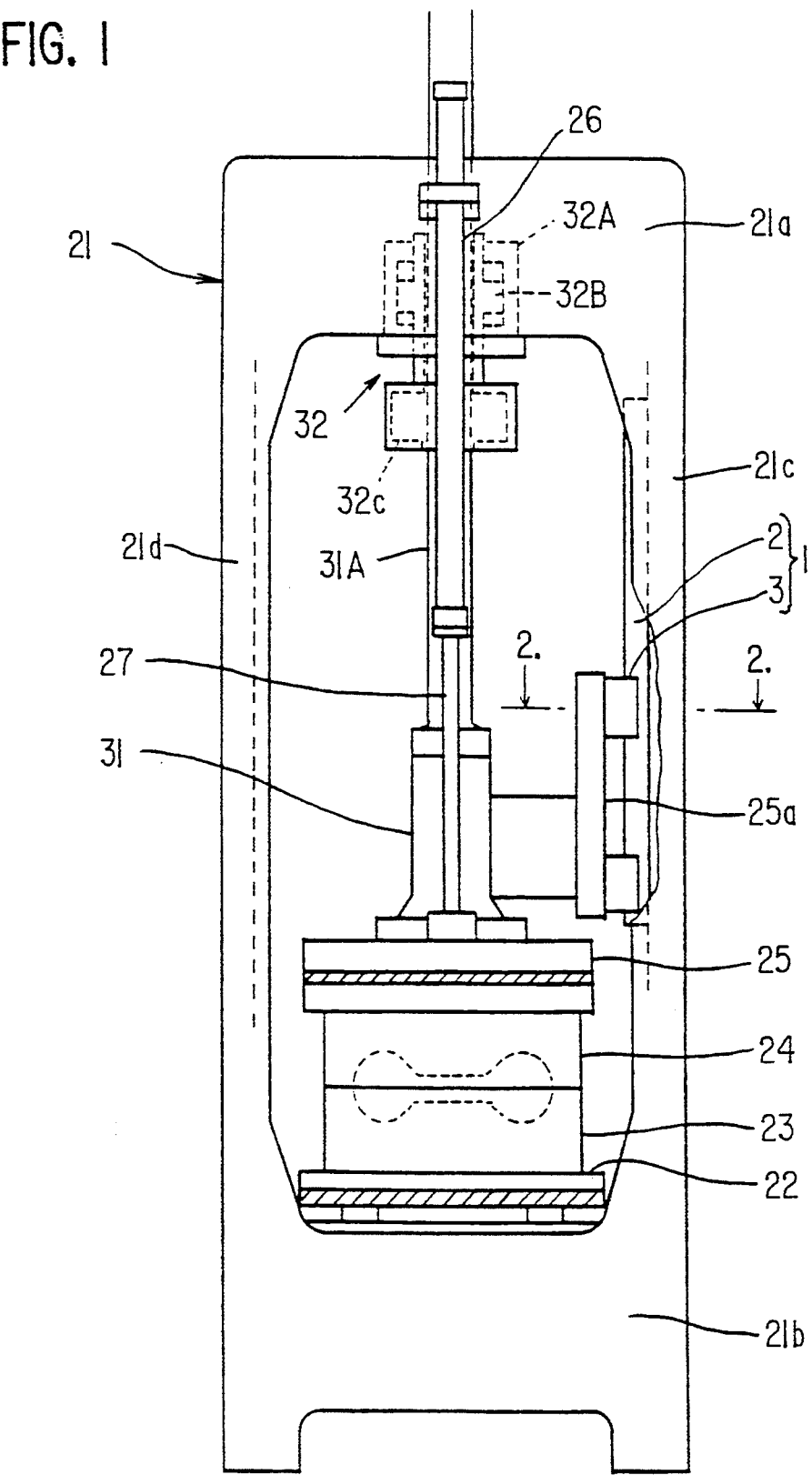
FIG. 1 is a whole construction view of a tire vulcanizing press showing a first embodiment according to the present invention.
Figure 2:
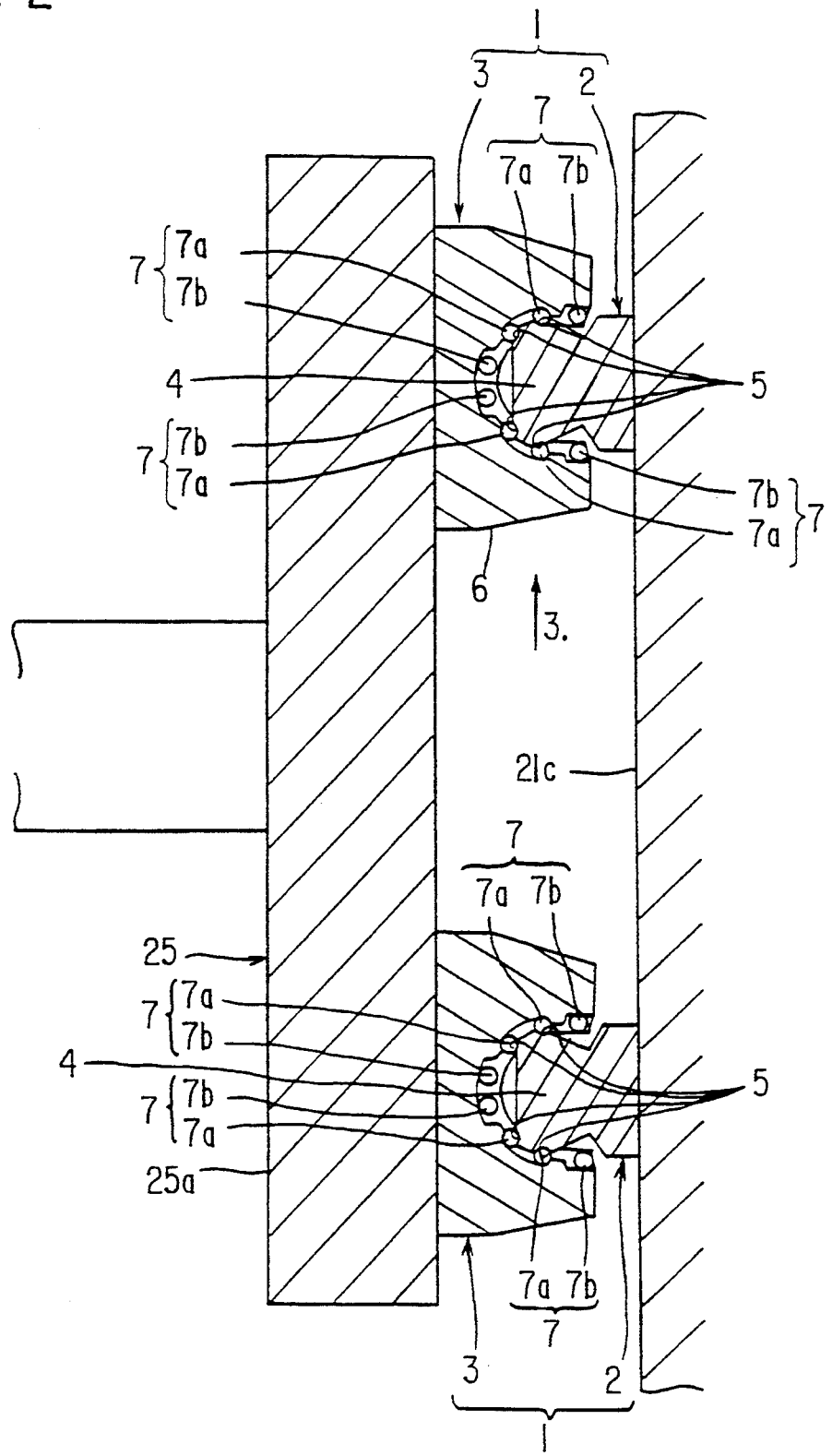
FIG. 2 is an enlarged sectional view taken along the line A—A of FIG. 1.
Figure 3:
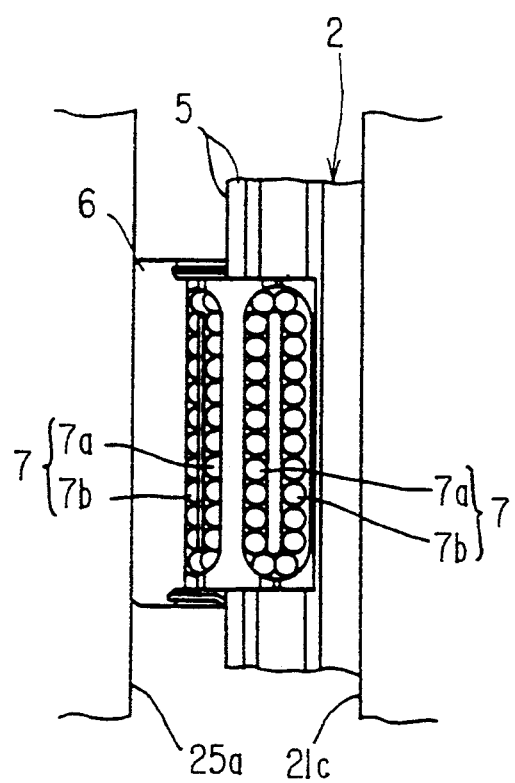
FIG. 3 is a view taken along the arrow B of FIG. 2.
Figure 22:
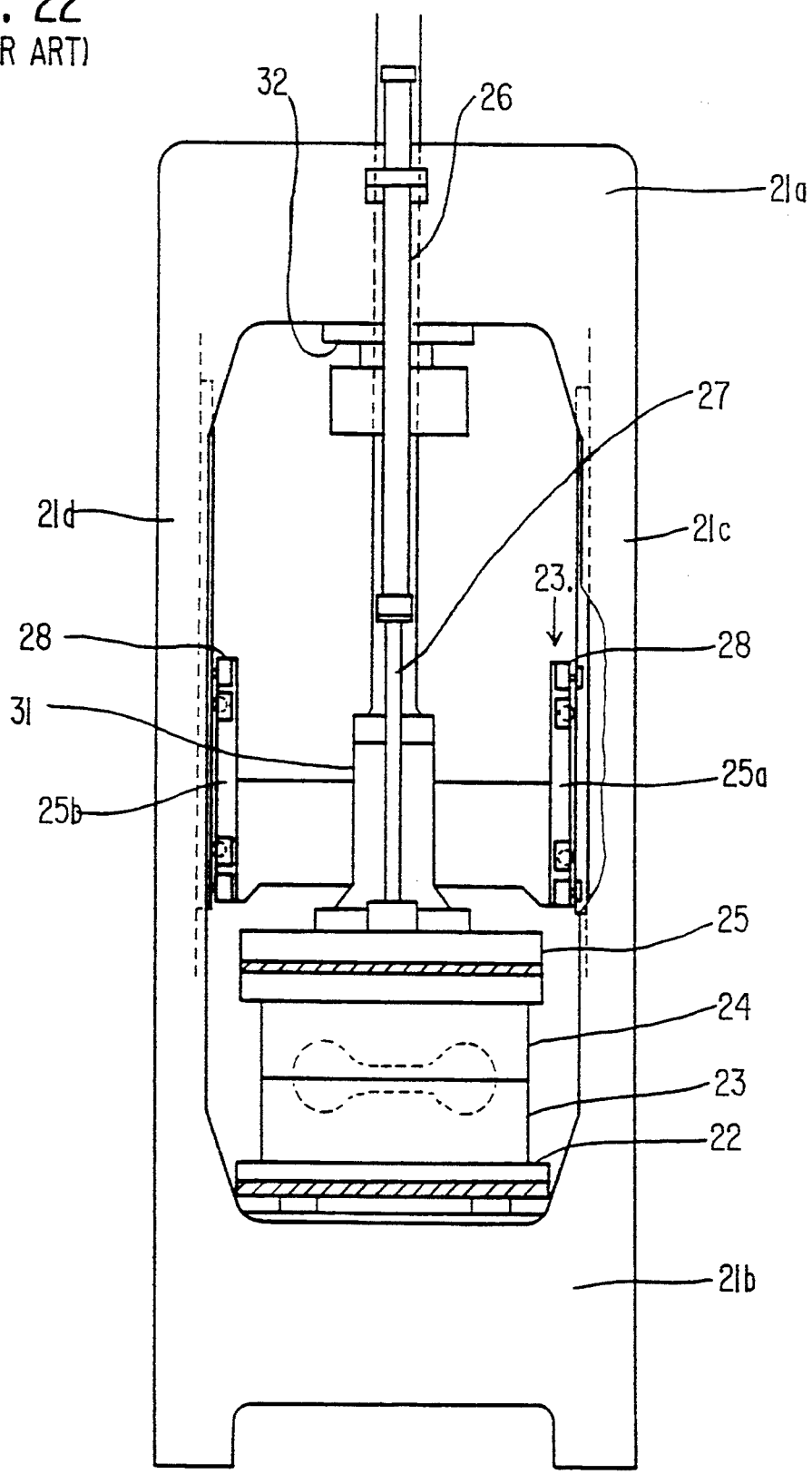
FIG. 22 is a view showing a prior art tire vulcanizing press.
Figure 23:
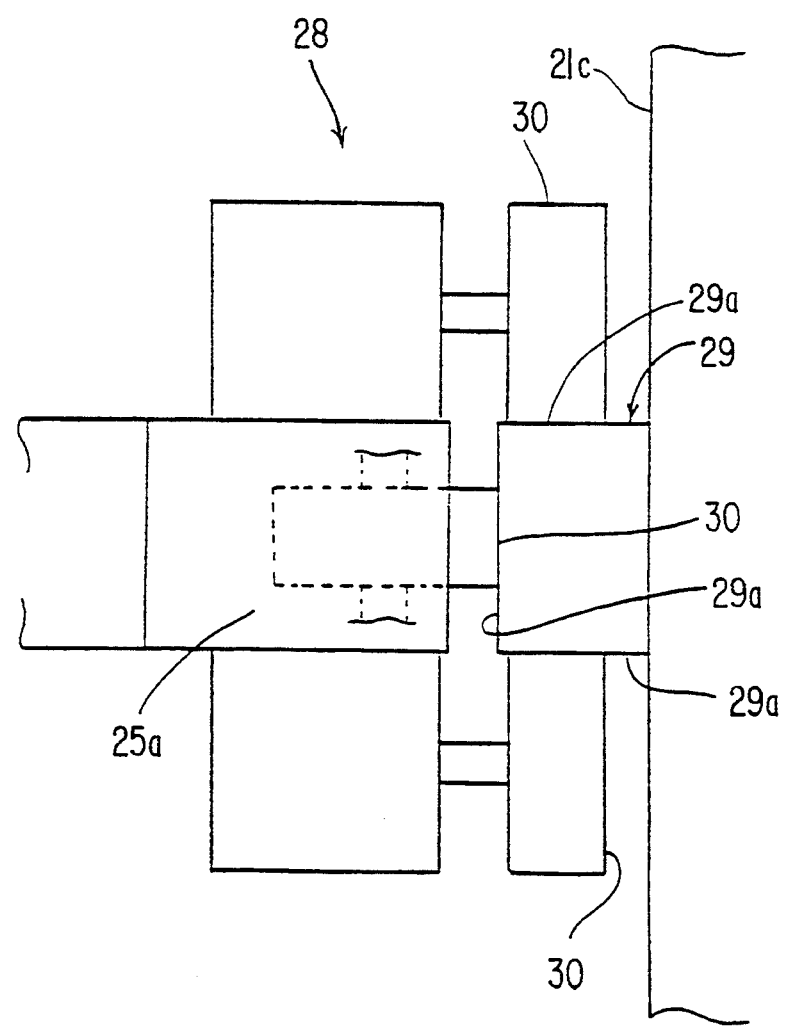
FIG. 23 is a view taken along the arrow D of FIG. 22.

1 is a view showing a tire vulcanizing press of the present invention; FIG. 2 is a sectional view taken along the line A—A of FIG. 1; and FIG. 3 is a view taken along the arrow B of FIG. 2. In addition, the whole construction of the tire vulcanizing press and its operation are the same as those described in FIGS. 22 and 23, and therefore, a guide member as the characteristic portion of the tire vulcanizing press of the present invention will be mainly described. In FIGS. 1 to 3, parts corresponding to those in FIGS. 22 and 23 are indicated at the same symbols, and the explanation thereof is omitted.

As shown in FIGS. 1 to 3, in the tire vulcanizing press, a guide member 1 is disposed between a right side portion 25a of an upper mold mounting member 25 and a right side frame 21c. The upper mold mounting member 25 is supported on the right side frame 21c in the cantilever state through the guide member 1. The guide member 1 includes rail bases 2 mounted on the right side frame 21c so as to vertically extend, and moving bases 3 mounted on a right side portion 25a of the upper mold mounting member 25. Four rail grooves 5 are provided on a shoulder portion 4 of each rail base 2, and four ball rows 7 composed of load ball rows 7a and escape ball rows 7b are incorporated in a vessel 6 of each moving base 3.

The load ball rows 7a and the escape ball rows 7b of the ball rows 7 in the moving base 3 can be circulated in both the directions. The load ball rows 7a rotate around their axes while revolving along the rail grooves 5 of the rail base 2, so that the moving base 3 travels along the rail base 2. Further, the load ball rows 7a are disposed so as to surround the shoulder portion 4 of the rail base 2 from four sides, and thereby the moving base 3 can receive the loads applied in all the directions.

In the guide member 1, the vessel 6 of the moving base 3 and the rail base 2 have high rigidity, and the rail groove 5 of the moving base 2 is formed in an R-like shape with a diameter approximate to that of the ball so that the balls are linearly contacted with the rail groove 5. Accordingly, the guide member 1 has a high rigidity as a whole.

Further, in the guide member 1, the moving base 3 is united with the rail base 2 in such a state as to be set thereto with high accuracy. Additionally, by making the backlash between the rail groove 5 and the ball row 7 zero through applying of a preload, it is possible to ensure the accurate linear motion without any gap and quick slip.

Liftable drive bodies 26 exemplified by two liftable cylinders are symmetrically disposed with respect to the press center line, so that the guide member 1 is not applied with the tipping moment.

A mold pressurizing apparatus 32 exemplified by a hollow cylinder includes a cylinder tube 32A fixed on an upper frame 21a, and a short-sized hollow piston 32B fitted in the cylinder tube 32A. An extending rod 31A of a pressure transmitting rod 31 is inserted in the piston 32B. The rod 31 removably engaged with the piston 32B through screw-engagement or by use of a removably engaging member 32C capable of being opened/closed.

Next, the operation of a tire vulcanizing press according to the first embodiment having the above construction will be described.

The upper mold mounting member 25 is lifted/lowered by operation of the liftable drive bodies exemplified by the liftable cylinders, to perform the charge and discharge of a tire, and to perform the closing of both the molds 23 and 24.

Further, by operation of the mold pressurizing apparatus 32 exemplified by the hollow pressurizing cylinder, a pressure is transmitted to the pressure transmitting rod 31, to lower the upper mold mounting member 25, thus performing the clamping. The vertical lifting/lowering of the upper mold mounting member 25 in this vulcanizing operation is performed by traveling of the moving bases 3 mounted on the right side portion 25a of the upper mold mounting member 25 along the rail bases 2 mounted on the right side frame 21c.

As for the above vertical lifting/lowering, since the guide member 1 formed of the moving bases 3 and the rail bases 2 has a high rigidity, it is possible that the upper mold mounting member 25 fixed with the upper mold 24 is supported on the right side frame 21c in the cantilever state, and in such cantilever state, the upper mold mounting member 25 is vertically lifted/lowered with respect to the lower mold mounting member 22. In this case, the vertical lifting/lowering of the upper mold mounting member 25 requires a high accuracy; however, since the guide member 1 can ensure the accurate linear motion, even in the lifting/lowering in the cantilever state, it is possible to sufficiently satisfy the requirement. As a result, the guide member 1 is disposed only on one side portion of the upper mold mounting member 25. This eliminates the adjustment, required in the prior art, for a parallelism between guide members disposed on two points, that is, on both the side portions of the upper mold mounting member 25.

In the guide member 1, since the moving base 3 is united with the rail base 2 in such a state as to be set thereto with high accuracy, there is no adjustment for the moving base 3 and the rail base 2. Further, since the mounting area for mounting the guide member 1 for the upper mold mounting member 25 and the side frame 21c can be reduced in half as compared with the prior art, the area to be machined is reduced in half, resulting in the extremely reduced cost. In addition, since only one of the side frames 21c and 21d is used, the remaining one can be used for a column of a vertical loader or the like, or the press frame can be made in the so-called C-type main body frame formed of an upper frame, an under frame and one side frame. In this C-type main body, the degree of freedom is made larger for the arrangement of the loader.

Figure 4:
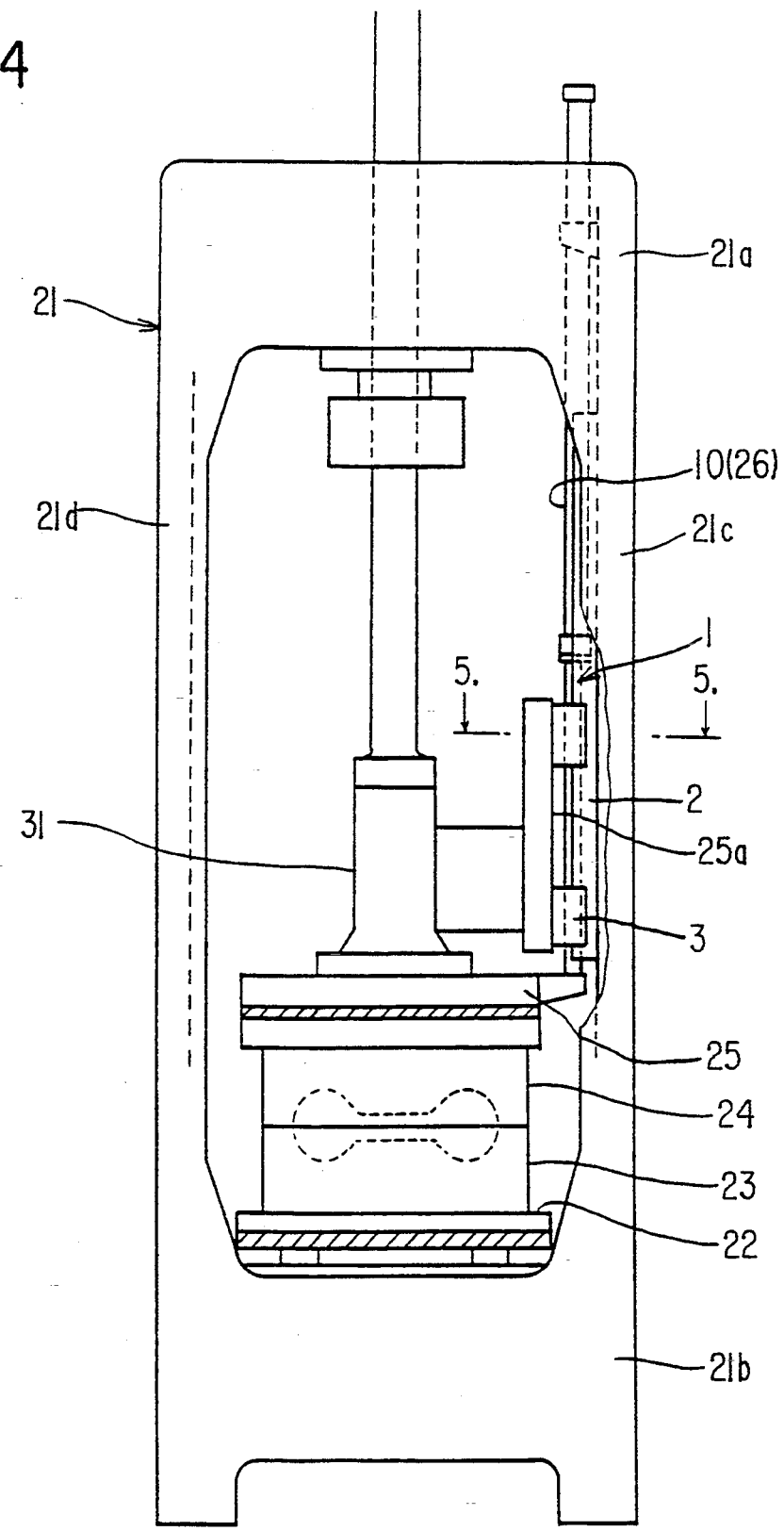
FIG. 4 is a whole construction view of a tire vulcanizing press of a second embodiment according to the present invention.
Figure 5:
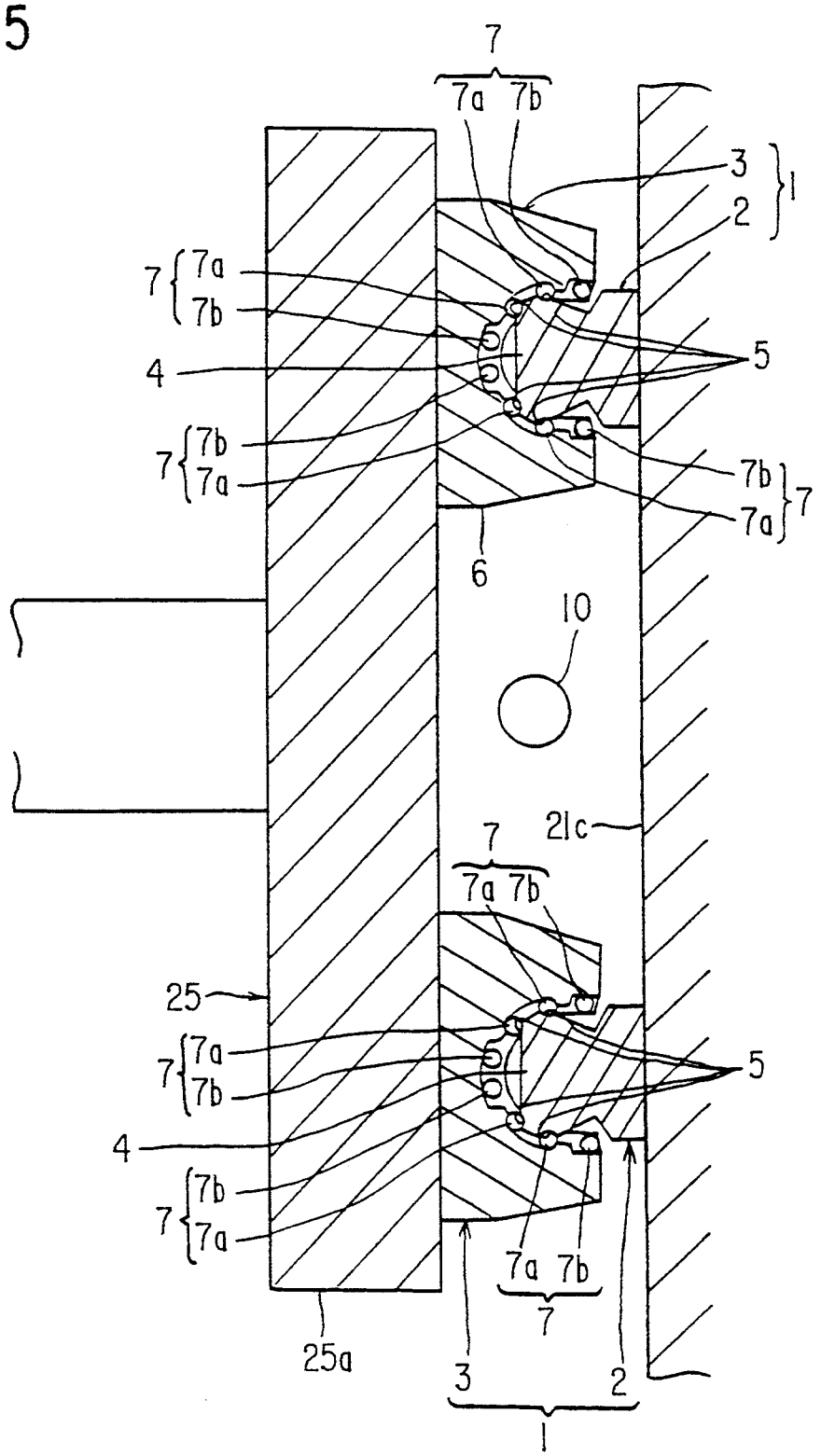
FIG. 5 is an enlarged sectional view taken along the line C—C of FIG. 4.

By use of the guide member 1, there can be generated a gap equivalent to the thickness of the guide member 1 between the right side portion 25a of the upper mold mounting member 25 and the side frame 21c, so that a liftable cylinder 10 may be disposed in this gap, as shown in a second embodiment of FIGS. 4 and 5, the cylinder 10 functioning as the liftable drive body. In addition, in FIGS. 4 and 5, parts common to those in FIGS. 1 to 3 are indicated at the same symbols.

In the above-described embodiments, the tire vulcanizing press of a type in which one vulcanizing mold is disposed on the main body frame has been described; however, the present invention can be similarly applied to the tire vulcanizing press of the so-called twin type in which a plurality of vulcanizing molds are disposed on the main body frame, which is described later, with the same effect as in the above-described embodiments.

Additionally, in the above-described embodiments, among the tire vulcanizing presses of a type in which the upper mold is vertically lifted/lowered with respect to the lower mold, there has been described the tire vulcanizing press of transmitting a pressure to the pressure transmitting rod erected on the upper mold mounting member by the hollow pressure cylinder fixed on the upper frame, thereby performing the clamping between the upper and lower molds. The present invention, however, may be similarly applied to a type of transmitting a pressure to a pressure transmitting rod capable of advancing and retreating along the upper mold mounting member by the solid pressure cylinder fixed on the upper frame; and a dome lock type of performing the clamping operation for the upper and lower molds in the upper and lower domes capable of being opened/closed, with the same effect as in the above-described embodiments.

Accordingly, the mold pressurizing apparatus of the present invention may be constructed in the form other than that shown in the figures. Further, the above-described cantilever guide member may be adopted for the so-called self-lock type tire vulcanizing press in which the pressurizing apparatus is not provided and the vulcanizing internal pressure is received by split-mold containers.

The liftable drive bodies may be mounted on either the upper portion or the lower portion, and may be constituted of a ball screw type or a rack-pinion type, other than the cylinder type.

In the above-described embodiments, the rail bases and the moving bases of the guide member are respectively provided on the side frame and the upper mold mounting member; however, they may be respectively provided on the upper mold mounting member and the side frame.

Next, tire vulcanizing presses as the other useful embodiments of the present invention will be described with reference to FIGS. 6 to 21.

Figure 6:
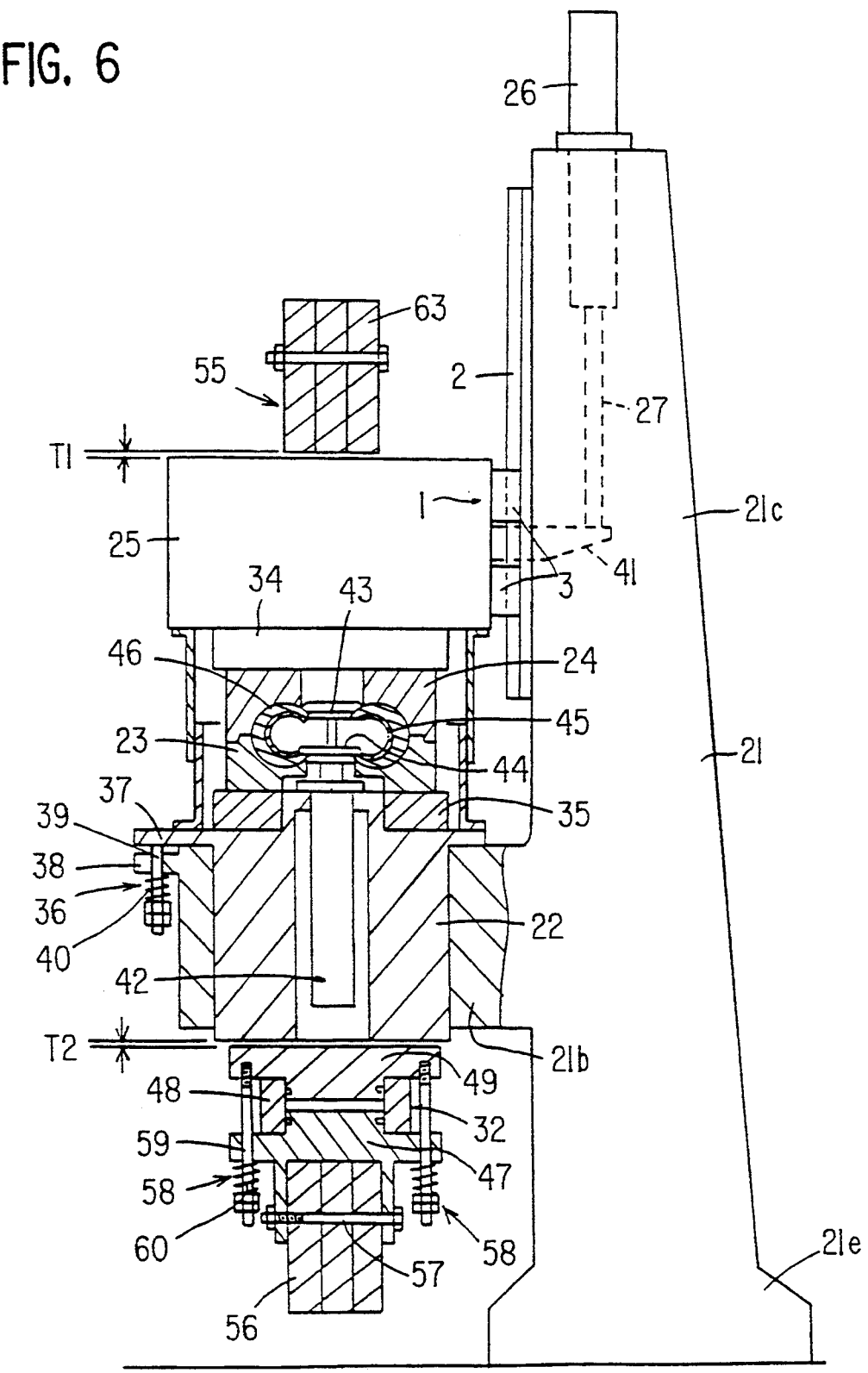
FIG. 6 is a vertical sectional view showing a third embodiment of the present invention, with parts partially cut-away.
Figure 7:
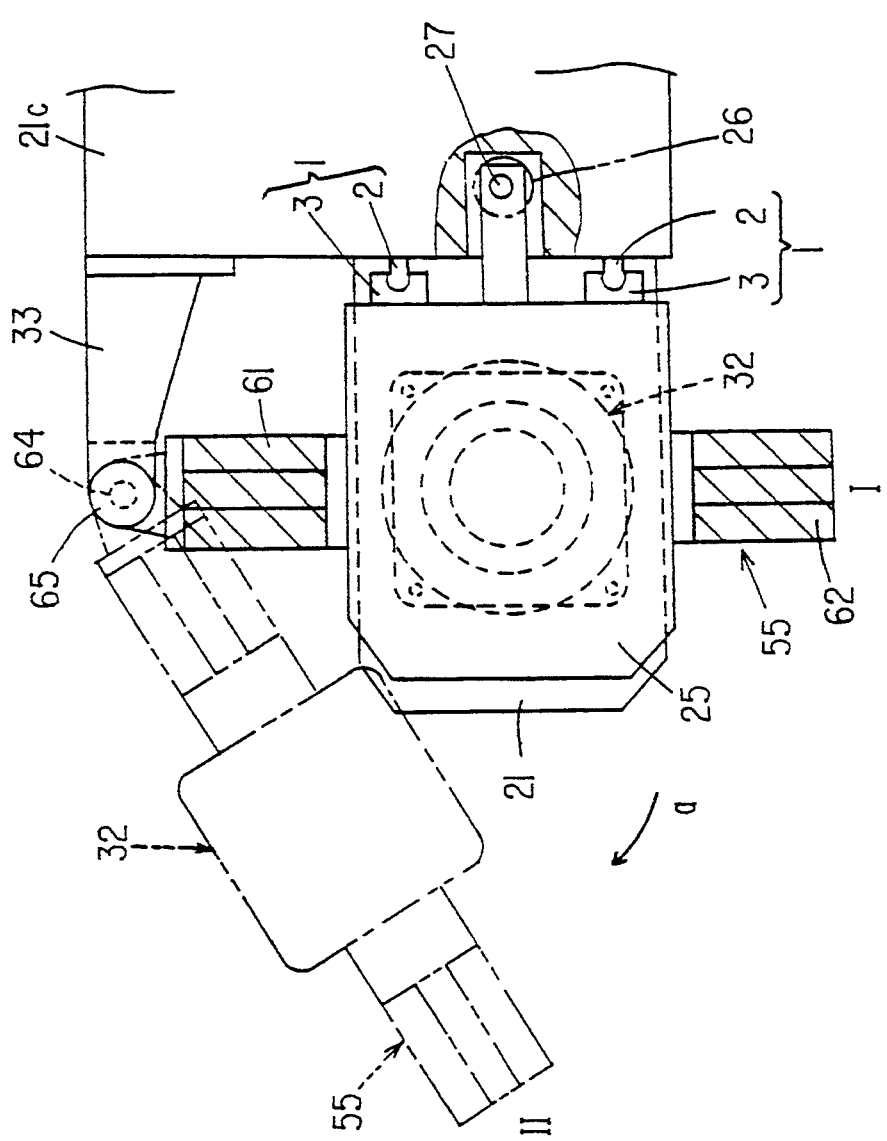
FIG. 7 is a plan view showing the third embodiment of the present invention, with parts partially broken-away.

FIGS. 6 and 7 show a third embodiment of a tire vulcanizing press according to the present invention. In FIGS. 6 and 7, a fixed vulcanizing apparatus main body frame 21 has a base portion 21e, which is integrally provided with a side frame 21c and a lower frame 21b. In the side frame 21c, vertical rail bases 2 are fixed on the front side, and a pivotably supporting bracket 33 is provided on one side. An upper mold mounting member 25 for fixing an upper mold 24 through an upper platen 34 includes moving bases 3 on its one side, and which is liftably supported on the vulcanizing apparatus main body frame 21 in the cantilever manner through a guide member 1 similar to that in the first embodiment.

A vertical hole is formed on the lower frame 21b, and a lower mold mounting member 22 for fixing a lower mold 23 through a lower platen 35 is provided so as to be liftably fitted in the above hole, and to be energized by return means 36.

The return means 36 are disposed in a plurality of numbers around the lower mold mounting member 22 with equal intervals. Each of the return means 36 includes a rod 39 fixed on a flange portion 37 of the lower mold mounting member 22 and vertically slidably inserted in a projecting portion 38 of the lower frame 21b; and a coil spring 40 wound around the rod 39 on the lower side of the projecting portion 38.

The guide member 1 includes balls already described with reference to FIGS. 2 and 3.

A bracket 41 is fixed on the upper mold mounting member 25, to which the end of a rod 27 of a cylinder 26 is connected, thus constituting a liftable drive body. The upper mold mounting member 25 is supported in the cantilever manner by the guide member 1 capable of acting in the same manner as in the first embodiment, to be thus vertically liftable.

The lower mold mounting member 22 is of a hollow cylinder structure, and includes a center mechanism 42 in the cylinder. The center mechanism 42 includes upper and lower bead rings 43 and 44, and a molding bladder 45 mounted thereto for shaping a green tire 46.

A short stroke mold pressurizing apparatus 32 for pressurizing the upper and lower molds 23 and 24 includes a cylinder 48 fitted on a supporting plate 47, and a piston 49 vertically slidably fitted on the cylinder 48. The mold pressurizing apparatus 32 is interposed between the lower mold mounting member 22 and a lower frame portion 56 of a pressurizing frame 55, and a supporting plate 47 is mounted on the lower frame portion 56 by a bolt 57. A plurality of return means 58 for a piston 49 are circumferentially provided with equal intervals between the piston 49 and the supporting plate 47. Each of the return means 58 includes a rod 59 fixed on the piston 49 and vertically slidably inserted in the supporting plate 47, and a coil spring 60 wound around the rod 59 on the lower side of the supporting plate 47.

The pressurizing frame 55 includes a pair of right and left vertical frame portions 61 and 62, and a pair of upper and lower frame portions 63 and 56, and which is formed in a rectangular frame shape in a front view. The vertical frame portion 61 is pivotably (rockingly) supported on a bracket 33 fixed on the side frame 21c of the vulcanizing apparatus main body 21 by a pin 64, and a rotary actuator 65 for rocking the pressurizing frame 55 around the pin 63 is mounted on the bracket 33. Further, the pressurizing frame is of an integral laminated structure in which a plurality of high strength steel plates are laminated. In addition, common steel plates may be used in place of the high strength steel plates. Further, the pressurizing frame 55 may be of a welding structure.

The pressurizing frame 55 is rockable between a pressurizing position I and an escape position II. When the pressurizing frame 55 is positioned at the pressurizing position I, the upper and lower mold mounting members 22 and 25, the upper and lower molds 23 and 24 and the mold pressuring apparatus 32 are vertically interposed between the upper and lower frame portions 63 and 56 of the pressurizing apparatus 55. Further, small gaps T1 and T2 are intended to be respectively formed between the upper frame portion 63 of the pressurizing frame 55 and the upper mold mounting member 25, and between the lower mold mounting member 22 and the mold pressurizing apparatus 32.

In the above-described third embodiment, when a green tire 46 inserted between the upper and lower molds 23 and 24 is vulcanized and molded, as shown in FIG. 7, the pressurizing frame 55 is set at the pressurizing position I, after which a pressure medium is supplied to the mold pressurizing apparatus 32, to push up the lower mold mounting member 22 by the piston 49.

The lower mold mounting member 22 is thus lifted against the return means 58, to push up the upper and lower molds 23 and 24, and the upper mold mounting member 25. Thus, the upper mold mounting member 25 is abutted on the upper frame portion 63 of the pressurizing frame 55, to thereby pressurize the upper and lower molds 23 and 24. At this time, the pressurizing frame 55 receives the vertical pressurizing reaction force.

In the case that the green tire 46 is vulcanized and molded and is ejected, the pressure medium of the mold pressuring apparatus 22 is first released, and the piston 49 is lowered by the return means 58. Then, the upper and lower mold mounting members 22 and 25, and the upper and lower molds 23 and 24 are lowered, so that the lower mold mounting member 22 is placed on the lower frame 21c.

Thus, since the small gap T1 is formed between the upper mold mounting member 25 and the upper frame portion 63 of the pressurizing frame 55, and the small gap T2 is formed between the lower mold mounting member 22 and the piston 49 of the mold pressurizing apparatus 32, the rotary actuator 65 is operated, to turn the pressurizing frame 55 around the pin 64 in the direction of the arrow a in FIG. 7, that is, from the pressurizing position I and the escape position II, thus escaping the pressurizing frame 55.

Next, the liftable drive body 26 is contracted to lift the upper mold mounting member 25 along the rail bases 2, thus lifting the upper mold 24. Consequently, the upper and lower molds 23 and 24 are opened, and subsequently the vulcanized tire on the lower mold 23 is ejected.

In the above construction, only the small gaps T1 and T2 being so small not to obstruct the escaping action of the pressurizing frame 55 are ensured between the upper and lower mold mounting members 22 and 25 sides and the pressurizing frame 55 side. Accordingly, it is possible to reduce the vertical length of the pressurizing frame 55, and to miniaturize the whole vulcanizing apparatus. Further, since the pressurizing frame is simple in its structure, the stress value in the actual loading is not deviated from the planned value (calculated value), so that the failure resistance is improved, and the safety and economical design can be obtained.

In addition, even if the pressuring force of the mold pressurizing apparatus 32 is abnormally eliminated on any reason during tire vulcanization, since each of the gaps T1 and T2 is within the range of 2 to 10 mm, the upper mold 24 is not largely opened, thus making it possible to suppress the blow-out of the vulcanizing steam present in the molding bladder 45 at minimum.

Even in the third embodiment, since the guide member 1 formed of the moving bases having the ball rows rotating around their axes while revolving and the rail bases 2 has a high rigidity, it is possible that the upper mold mounting member 25 fixed with the upper mold 24 is supported on the right side frame 21c in the cantilever state, and in the cantilever state, the upper mold mounting member 25 is vertically lifted/lowered with respect to the lower mold mounting member 22. In this case, the vertical lifting/lowering of the upper mold mounting member 25 requires a high accuracy; however, since the guide member 1 can ensure the accurate linear motion, even in the cantilever state, it is possible to sufficiently satisfy the requirement.

Further, since the guide member 1 is not provided on the pressurizing frame 55 for receiving a pressure, the deformation of the pressurizing frame 55 due to the pressure is not exerted on the guide member 1.

Figure 8:
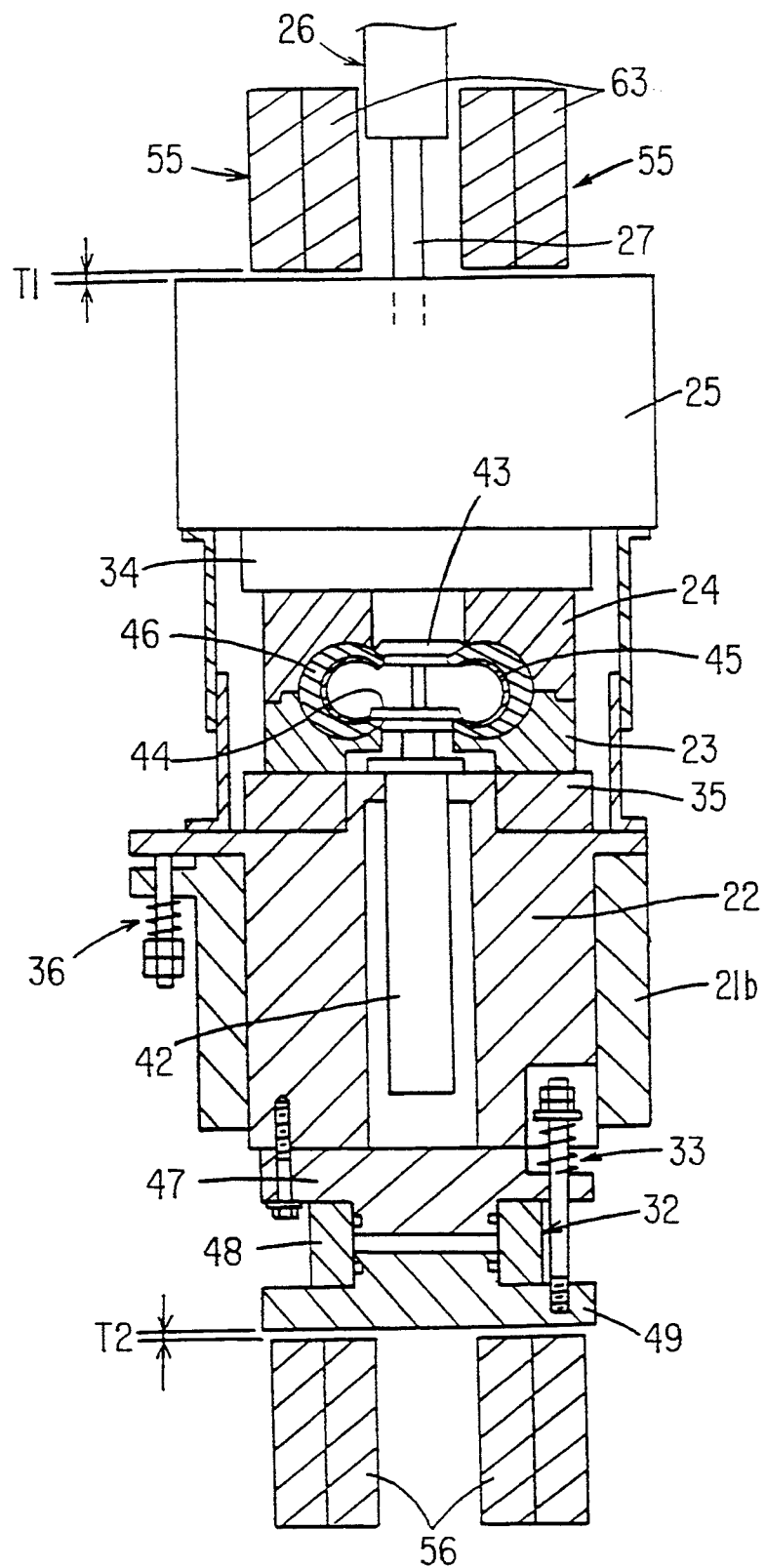
FIG. 8 is a front view showing a fourth embodiment of the present invention, with parts partially broken-away.
Figure 9:
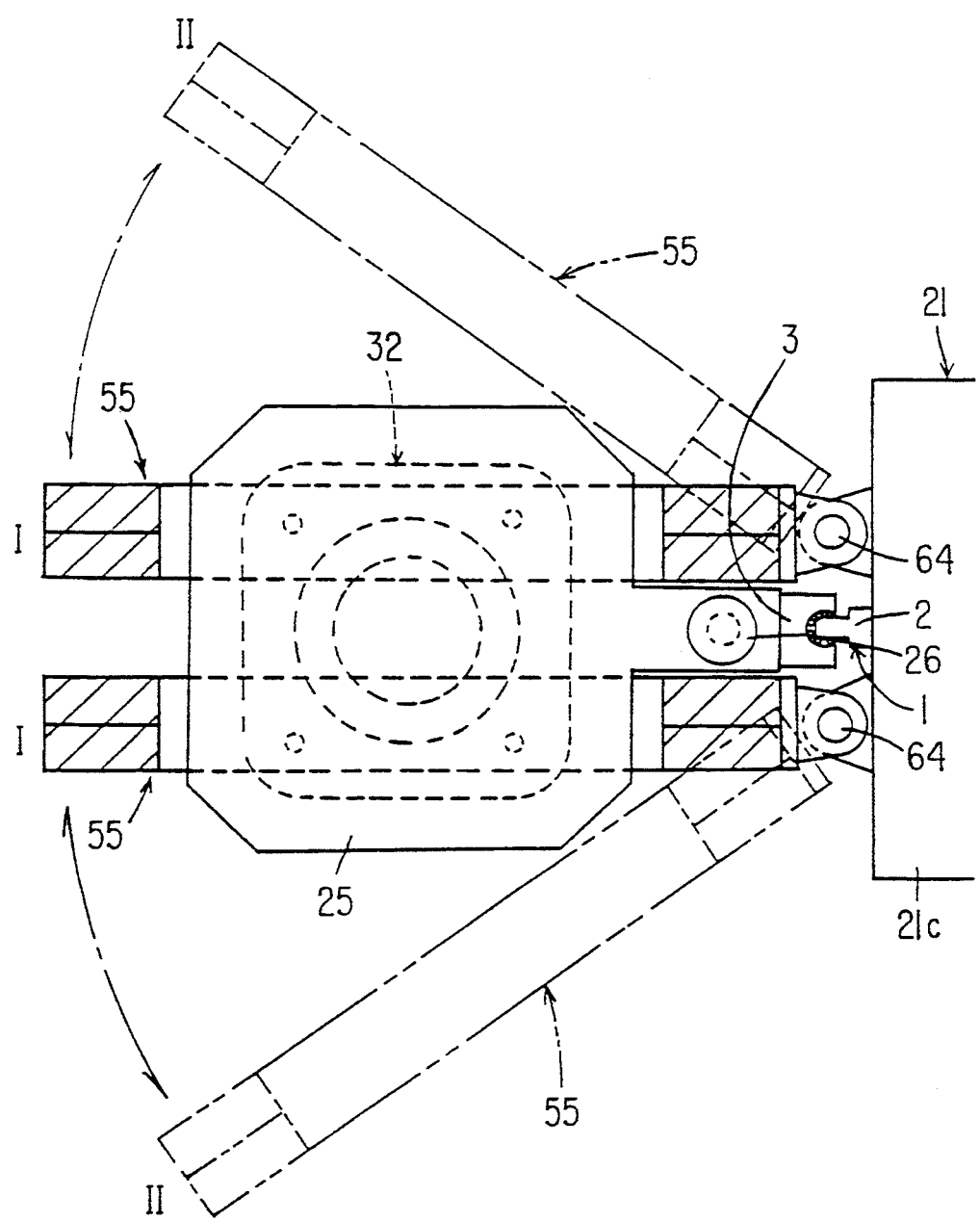
FIG. 9 is a plan view showing the fourth embodiment of the present invention, with parts partially broken-away.

FIGS. 8 and 9 show a fourth embodiment of the present invention, which is different from the third embodiment in that a pair of right and left pressurizing frames 55 are provided on the front side of a pressurizing apparatus main body frame 21 in such a manner as to be turned just as in double-leafed hinged doors around a pin 64 between escape positions II where they are externally apart from each other, and the pressurizing positions I where they are in parallel to each other; and in that, in a mold pressurizing apparatus 32, a supporting plate 47 is mounted on a lower mold mounting member 22 and a small gap T2 is formed between a piston 49 and a lower frame portion 56 of the pressurizing frame 55. The other construction and the operation in this embodiment are the same as those in the third embodiment, and therefore, the common parts are indicated at the same symbols. Accordingly, the operation of this fourth embodiment is nearly the same as in the third embodiment.

Figure 10:
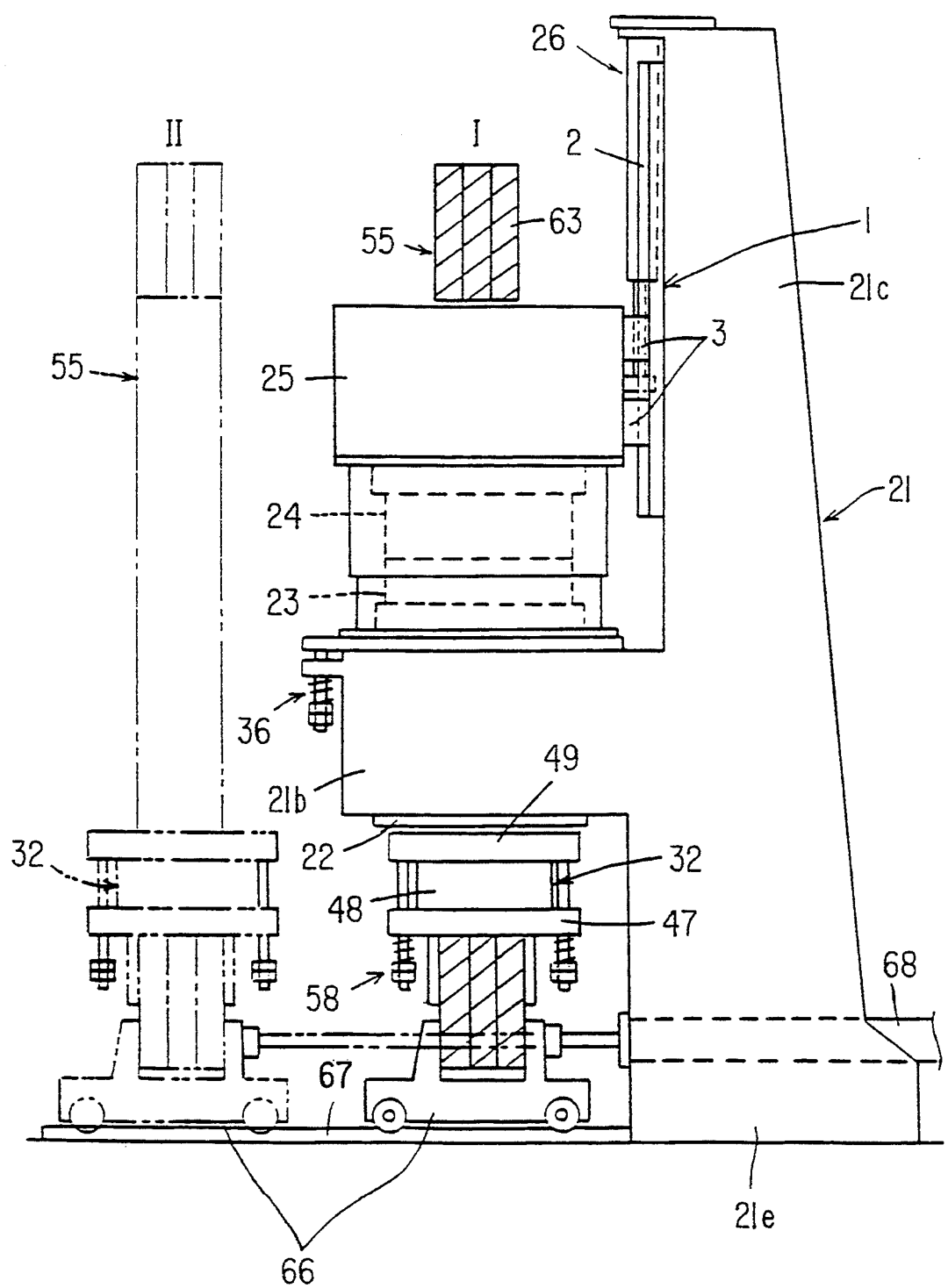
FIG. 10 is a side view showing a fifth embodiment of the present invention, with parts partially cut-away.

FIG. 10 shows a fifth embodiment of the present invention, which is different from the third and fourth embodiments in that a pressurizing frame 55 is linearly movable. Namely, the pressurizing frame 55 is mounted on a carrier 66, and the carrier 66 is movable along rails 67 in the longitudinal direction. A moving cylinder 68 for moving the carrier 66 is provided between the carrier 66 and a vulcanizing apparatus main body frame 21. Accordingly, by extending/contracting the moving cylinder 68, it is possible to move the pressurizing frame 55 in the longitudinal direction between a pressurizing position I and an escape position II. The others are common to those in the third and fourth embodiments, and are indicated by the same characters.

Figure 11:
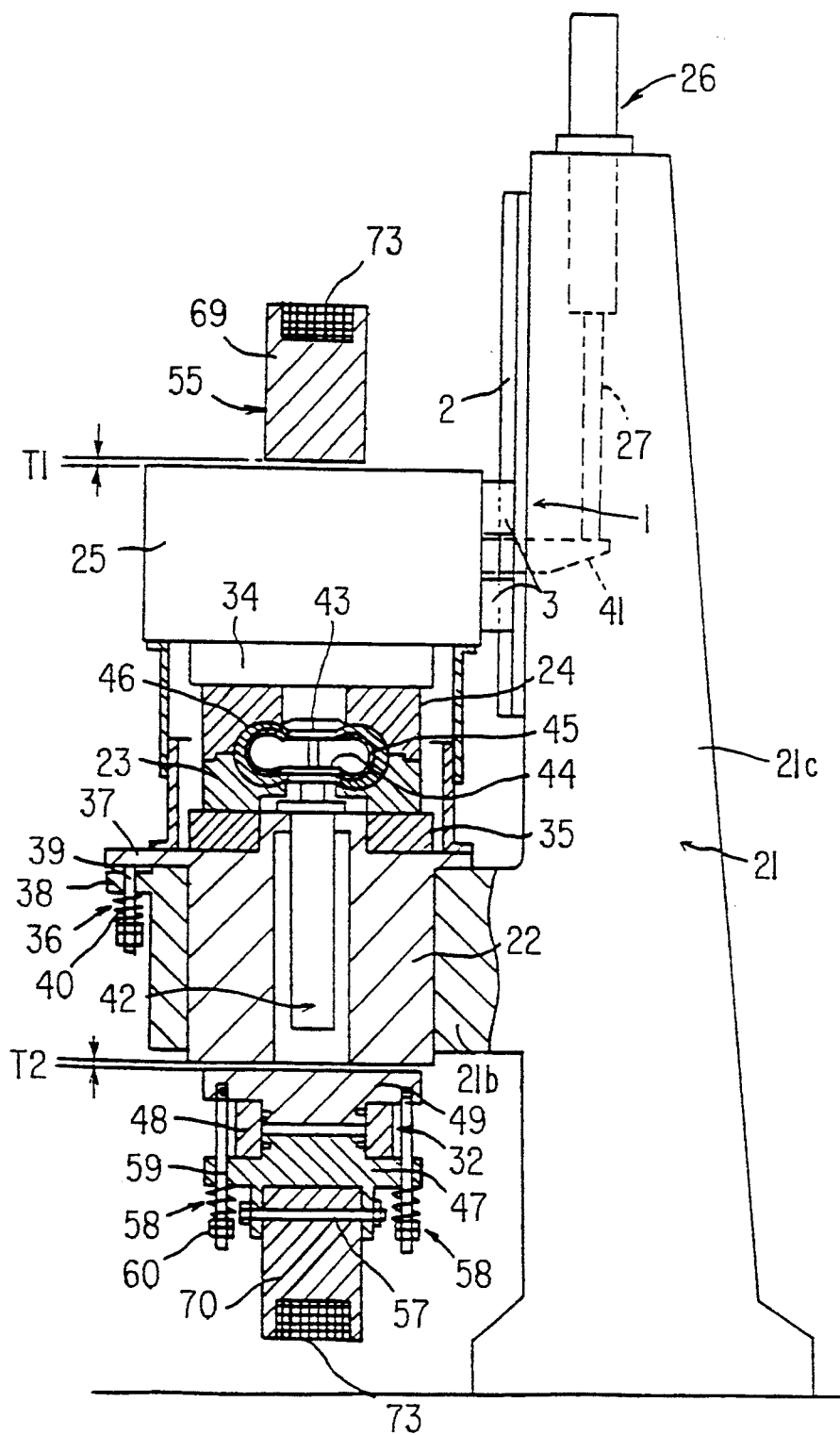
FIG. 11 is a side view showing a sixth embodiment of the present invention, with parts partially cut-away.
Figure 12:
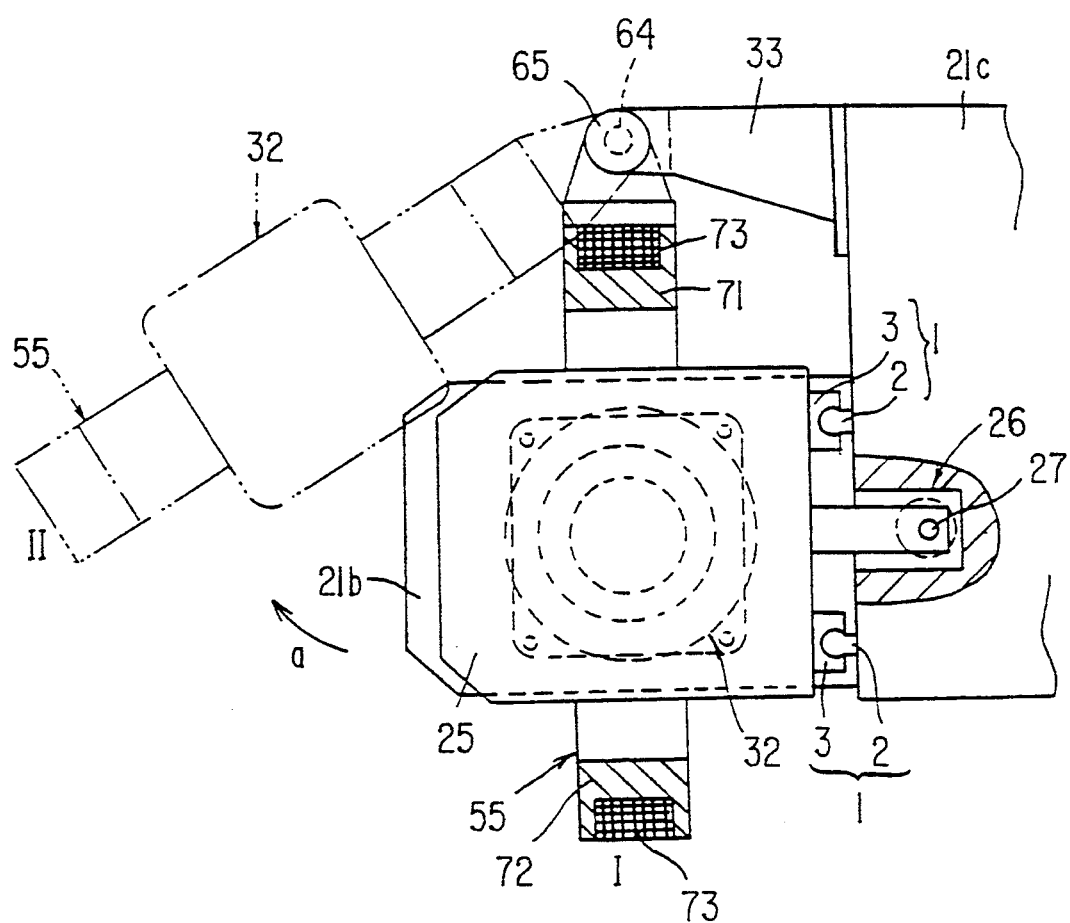
FIG. 12 is a plan view of FIG. 11, with parts partially broken-away.
Figure 13:
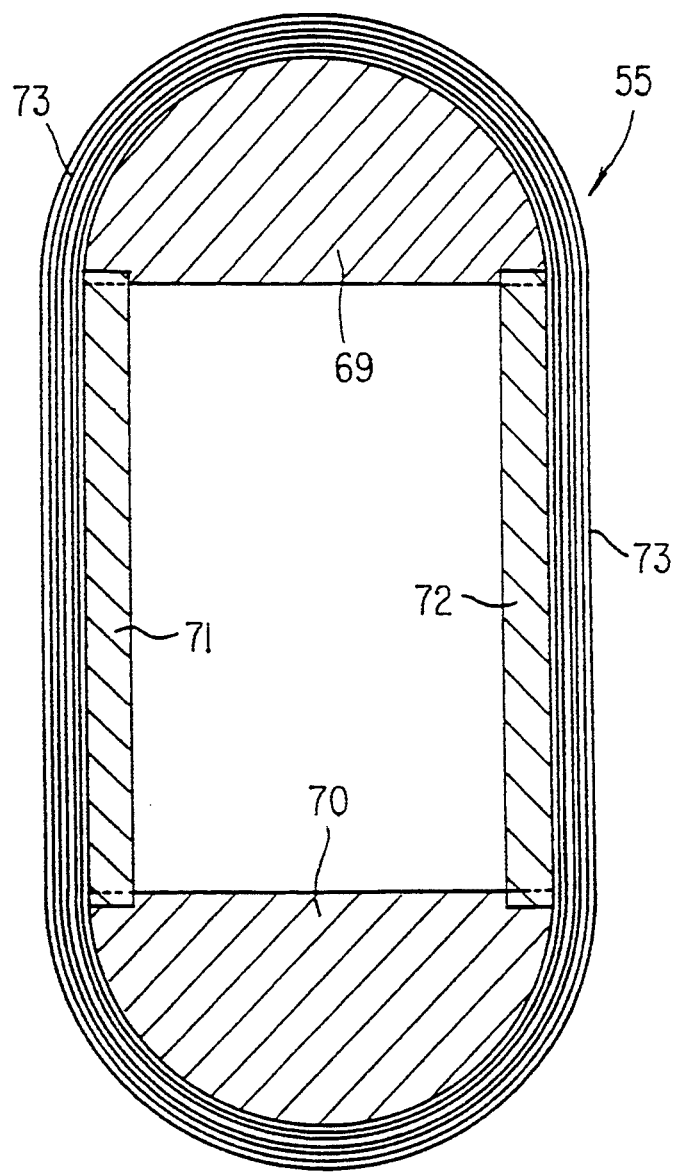
FIG. 13 is a longitudinal sectional view showing the central portion of a pressurizing frame of the sixth embodiment.

FIGS. 11 to 13 show a sixth embodiment of the present invention, which is different from the third and fourth embodiments in that a pressurizing frame 55 is of a winding structure. Namely, the pressurizing frame 55 is so constructed that an upper yoke 69, a lower yoke 70, and right and left distance pieces 71 and 72 are disposed in a frame-like shape, around which a wire 73 such as a piano wire is wound in the vertical and horizontal directions by a plurality of turns.

A supporting plate 57 of a mold pressurizing apparatus 22 is mounted on the lower yoke 70 by a bolt 57.

The operation of the sixth embodiment is the same as in the third embodiment, and therefore, the common parts are indicated by the same symbols. According to the sixth embodiment, since the pressurizing frame 55 has a winding structure, it is made smaller and lightened than that in the third embodiment.

Figure 14:
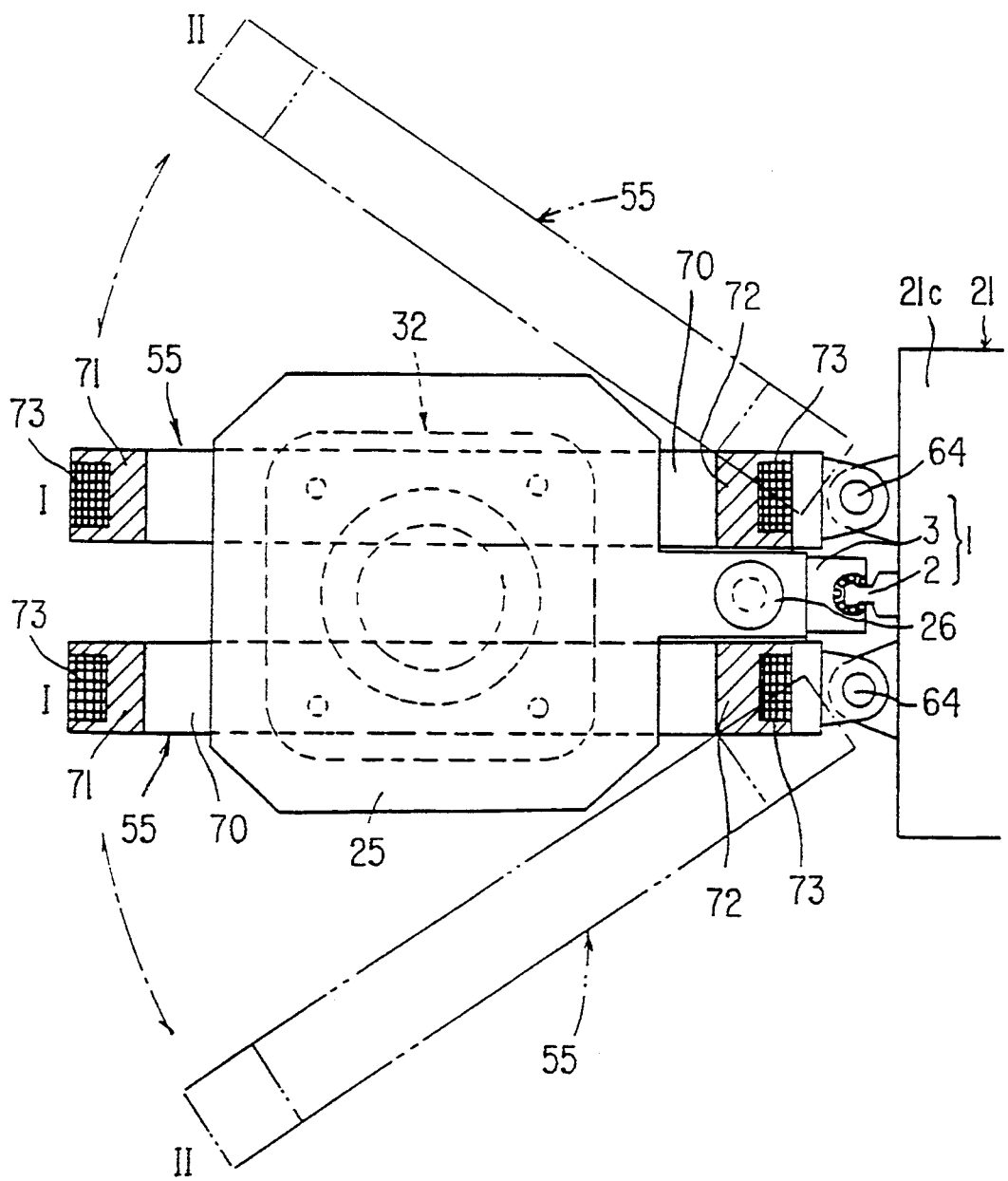
FIG. 14 is a plan view showing main parts of a seventh embodiment of the present invention, with parts partially broken-away.

FIG. 14 shows a seventh embodiment of the present invention, which is different from the fourth embodiment in that a pressurizing frame 55 has a winding structure similarly to the sixth embodiment, and is operated in the same manner as in the fourth embodiment. Accordingly, the common parts are indicated at the same symbols. In addition, according to the seventh embodiment, the pressurizing frame 55 is made further smaller and lightened than that in the fourth embodiment.

Figure 15:
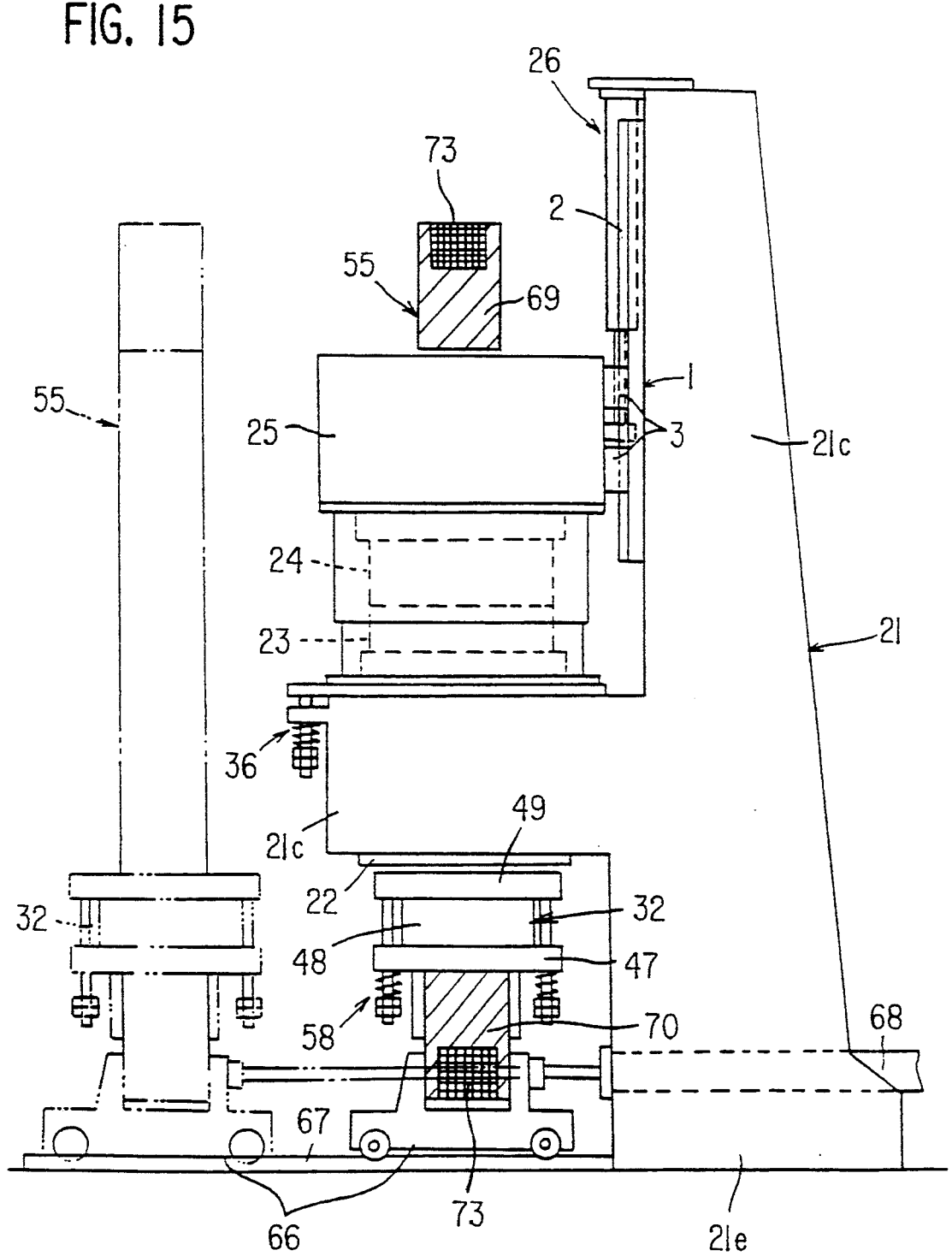
FIG. 15 is a side view showing an eighth embodiment of the present invention, with parts partially cut-away.

FIG. 15 shows an eighth embodiment of the present invention, which is different from the fifth embodiment in that a pressurizing frame 55 has a winding structure similarly to the sixth embodiment, and is operated in the same manner as in the fifth embodiment. Accordingly, the common parts are indicated at the same symbols. In the eighth embodiment, the pressurizing frame 55 is made further smaller and lightened than in the fifth embodiment.

FIGS. 16 to 19 show the so-called twin type tire vulcanizing press wherein two sets of openable vulcanizing mold apparatuses composed of upper and lower molds 23 and 24 are laterally juxtaposed. A pressurizing frame 55 is switchable in removably engaging manner with respect to the vulcanizing molds. Parts common to those in the above embodiments are indicated at the same symbols.

Figure 16:
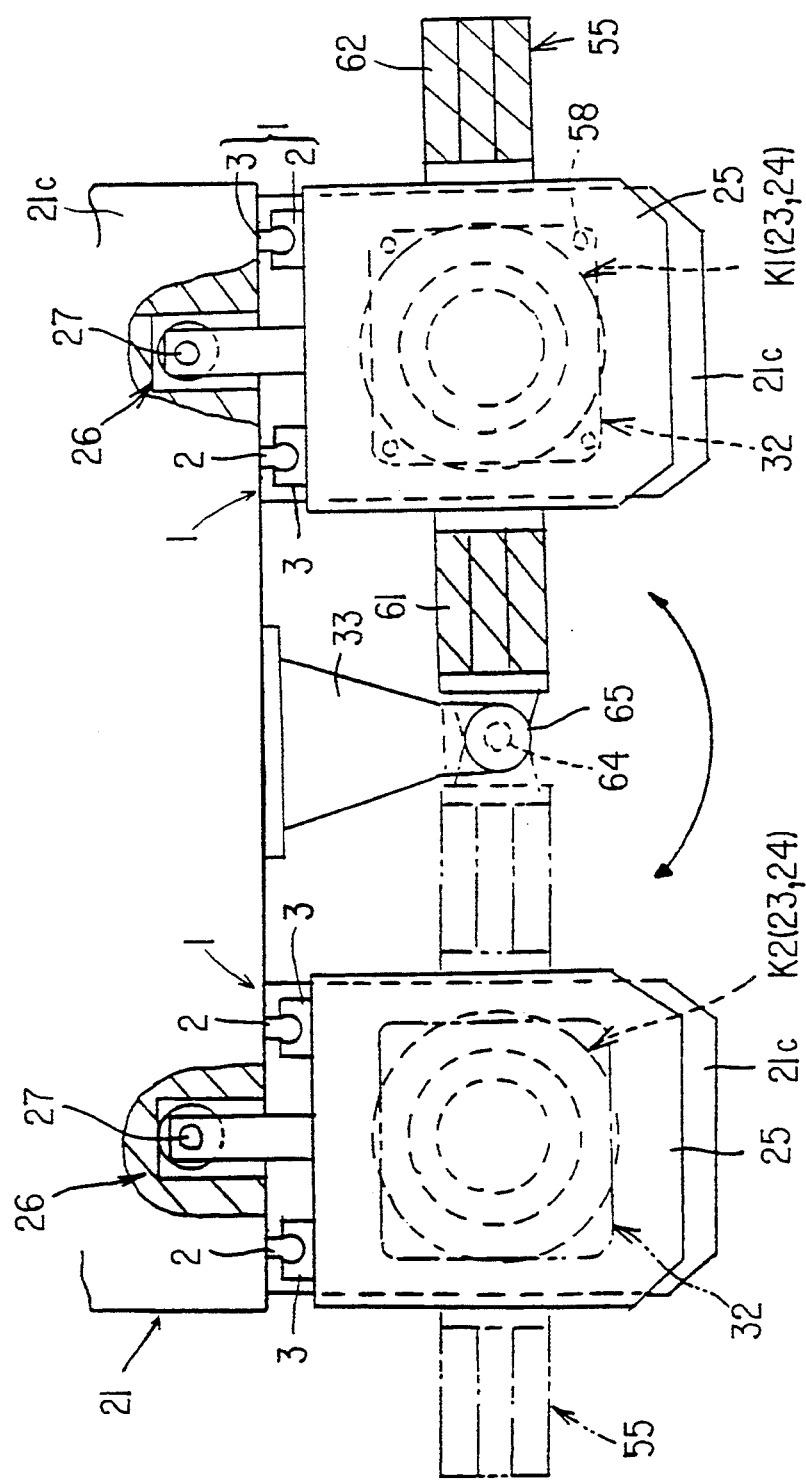
FIG. 16 is a plan view showing a twin type tire vulcanizing press, with parts partially broken-away.

In FIG. 16, two sets of vulcanizing mold apparatuses K1 and K2 are laterally juxtaposed, and a turning pin 64 for turning a pressurizing frame 55 is provided therebetween. Thus, the pressurizing frame 55 is turned by 180° together with a mold pressurizing apparatus 32 by a rotary actuator 65, so that one vulcanizing mold apparatus K1 operates during vulcanizing molding while the other vulcanizing mold apparatus K2 operates in ejecting the molded tire and in charging a green tire.

Figure 17:
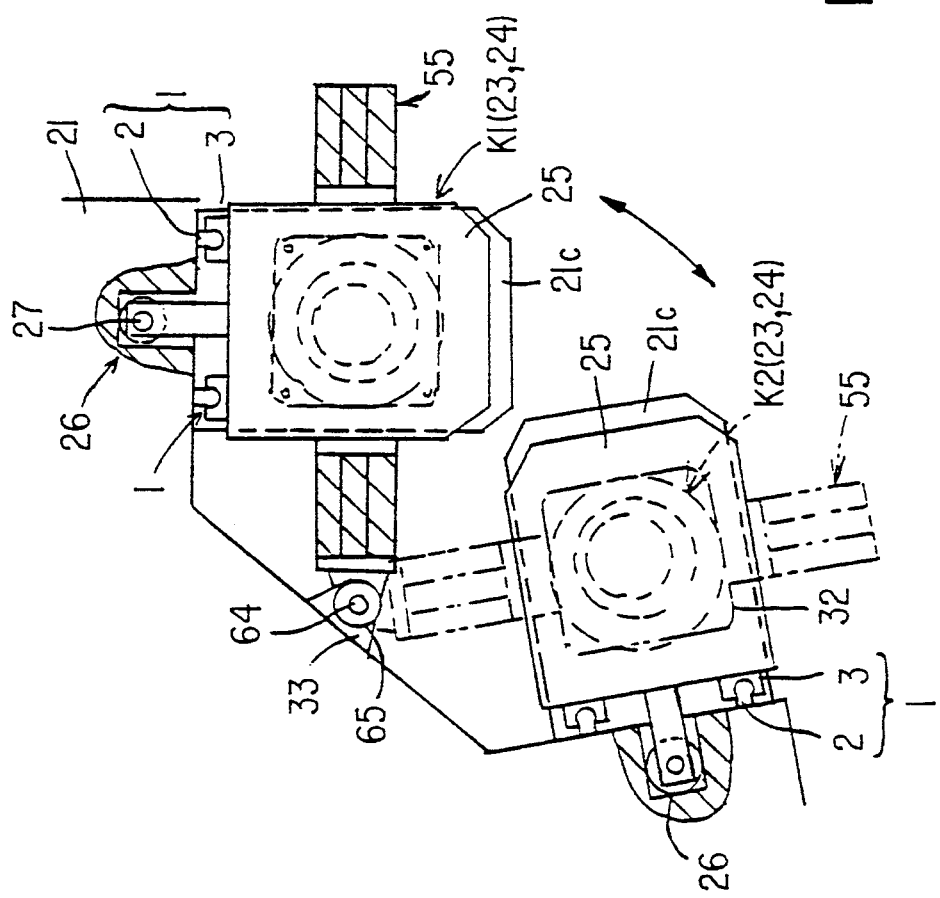
FIG. 17 is a plan view showing a second example of a twin type tire vulcanizing press, with parts partially broken-away.

FIG. 17 shows a modification wherein two sets of vulcanizing mold apparatus K1 and K2 are juxtaposed so as to be apart nearly 90°, and a pressurizing frame 55 is turned by 90° together with a mold pressurizing apparatus 32 so as to be switchable in removably engaging manner.

Figure 18:
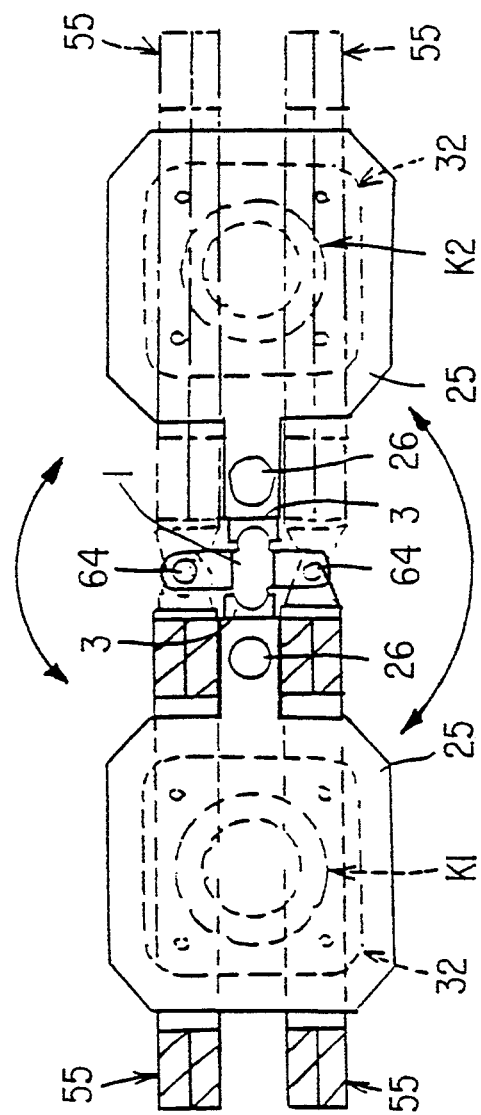
FIG. 18 a plan view showing a third example of a twin type tire vulcanizing press, with parts partially broken-away.

FIG. 18 is of a twin type of the tire vulcanizing press as shown in FIG. 8. Mold pressurizing apparatuses 32 are respectively provided on vulcanizing mold apparatuses K1 and K2, and a pressurizing frame 55 is provided so as to be operated just as double-leafed hinged doors, to be switchable in the removably engaging manner.

Figure 19:
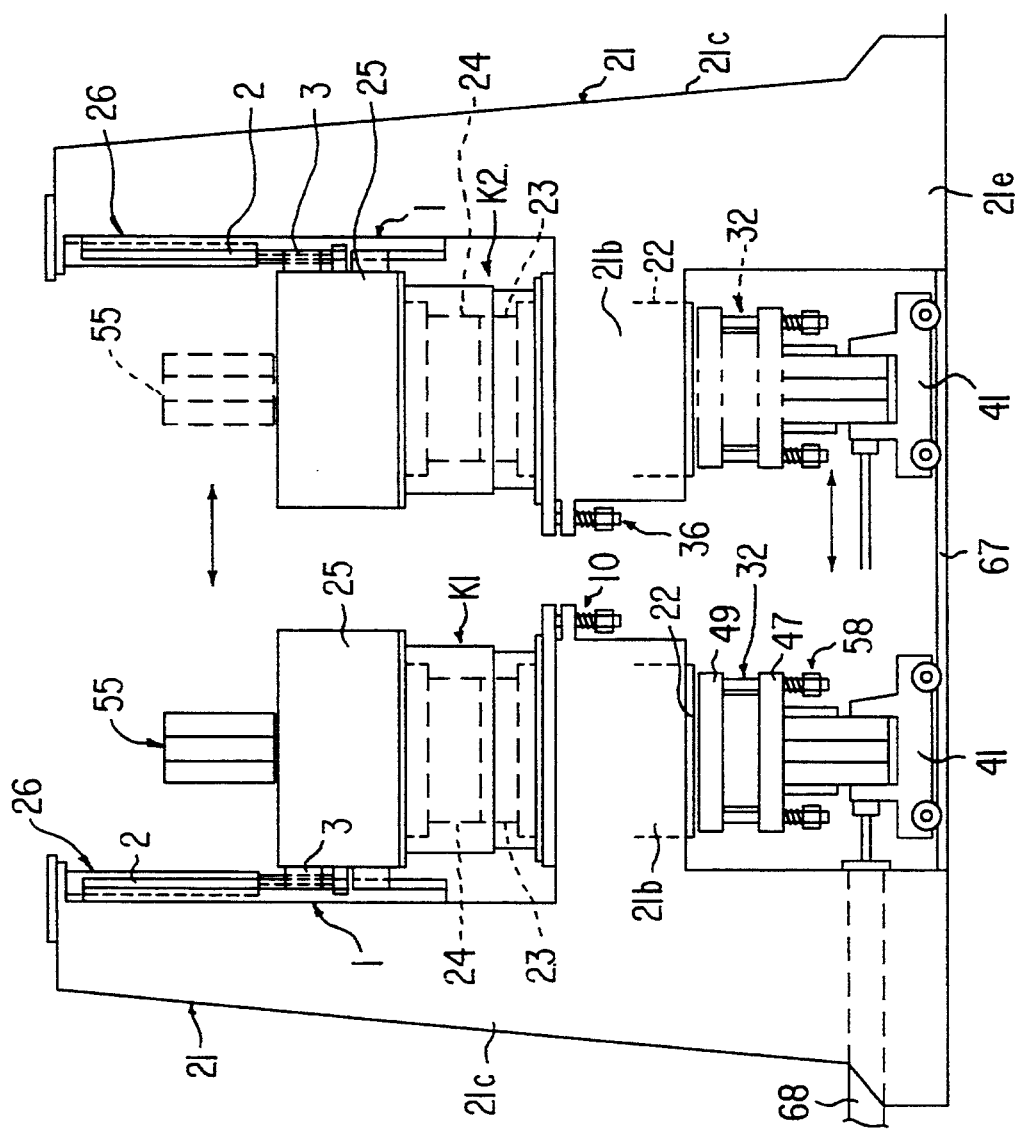
FIG. 19 a plan view showing a fourth example of a twin type tire vulcanizing press, with parts partially cut-away.

FIG. 19 is of a twin type of the tire vulcanizing press as shown in FIG. 11. Carrier type pressurizing frames 55 having mold pressurizing apparatuses 32 are provided on two sets of mold apparatuses K1 and K2 laterally juxtaposed so as to be switchable in removably engaging manner.

In addition, as for the pressurizing frame 55 of the so-called twin type tire vulcanizing press shown in FIGS. 16 to 19, the so-called winding type including the wire 73 already described with reference to FIGS. 11 to 14 may be freely applied thereto.

In the above-described embodiments, the mold pressurizing apparatus 32 may be provided on the upper mold mounting member 25, on the upper frame portion 63 of the pressurizing frame 55, and on the lower side of the upper yoke 69. Further, the liftable drive body 26 can adopt a ball-screw mechanism in place of the expansible cylinder.

Further, since the small gap T1 between the upper mold mounting member 25 and the pressurizing frame 55 is changed when the upper and lower molds 23 and 24 interposed between the upper and lower mold mounting members 22 and 25 is different in height from each other, a mold height adjusting apparatus for adjusting the small gap T1 may be provided on the upper side of the upper mold mounting member 25. The mold height adjusting apparatus may adopt an electrically driven hydraulic cylinder and the other adjustable mechanism.

The mold height adjusting apparatus may be mounted on the inner surface of the upper frame portion 63 of the pressurizing frame 55, or on the lower frame portion 56. Further, it may be mounted between the upper mold mounting member 25 and the upper platen 34.

In addition, the present invention is not limited to the above-described embodiments. For example, the pressurizing frame 55 may adopt a plurality winding structures wherein winding layers are crossed to each other on the upper and lower surfaces, and further suitably changed in design.

Figure 20:
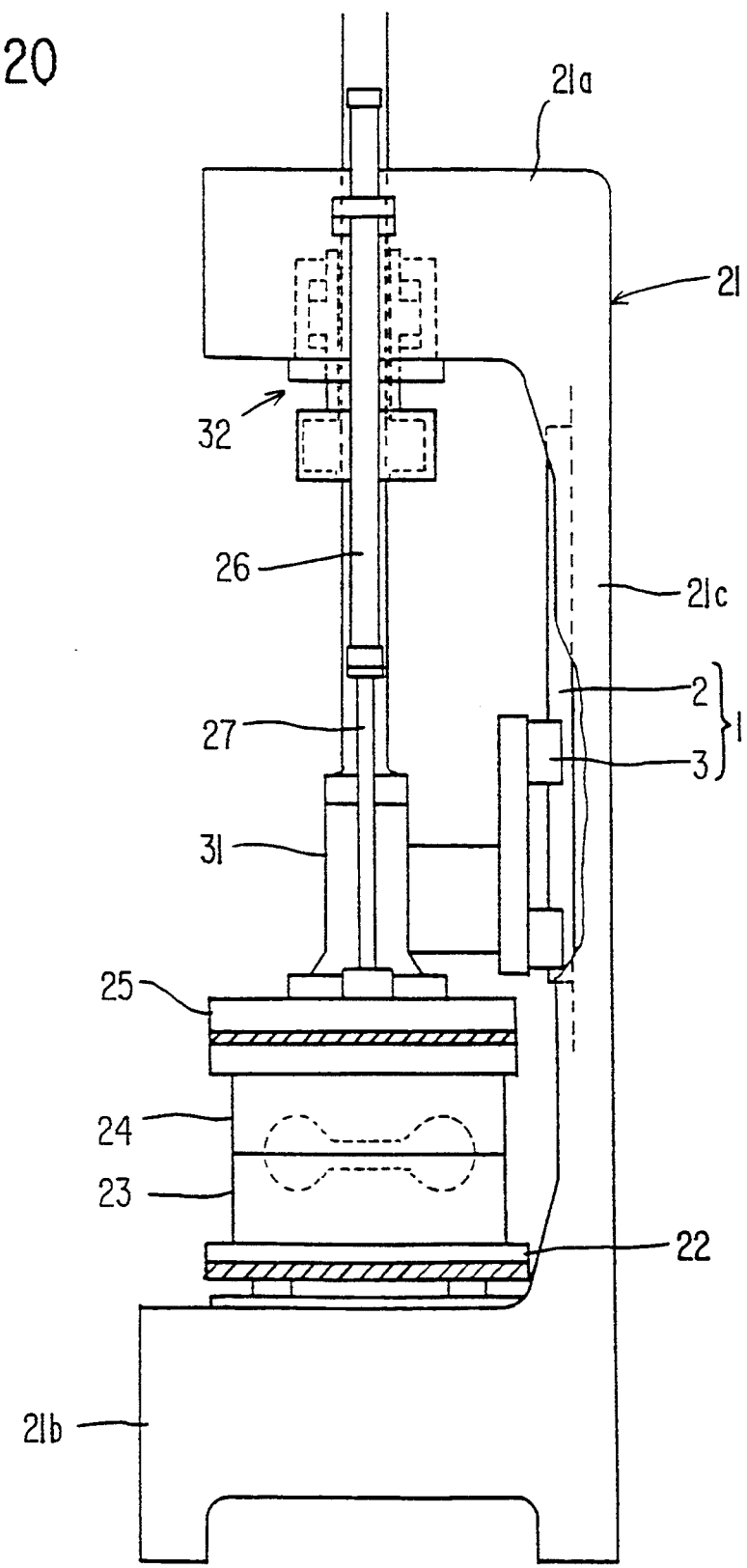
FIG. 20 is a schematic elevational view showing a tenth embodiment of the present invention, wherein the main body frame is C-shaped.
Figure 21:
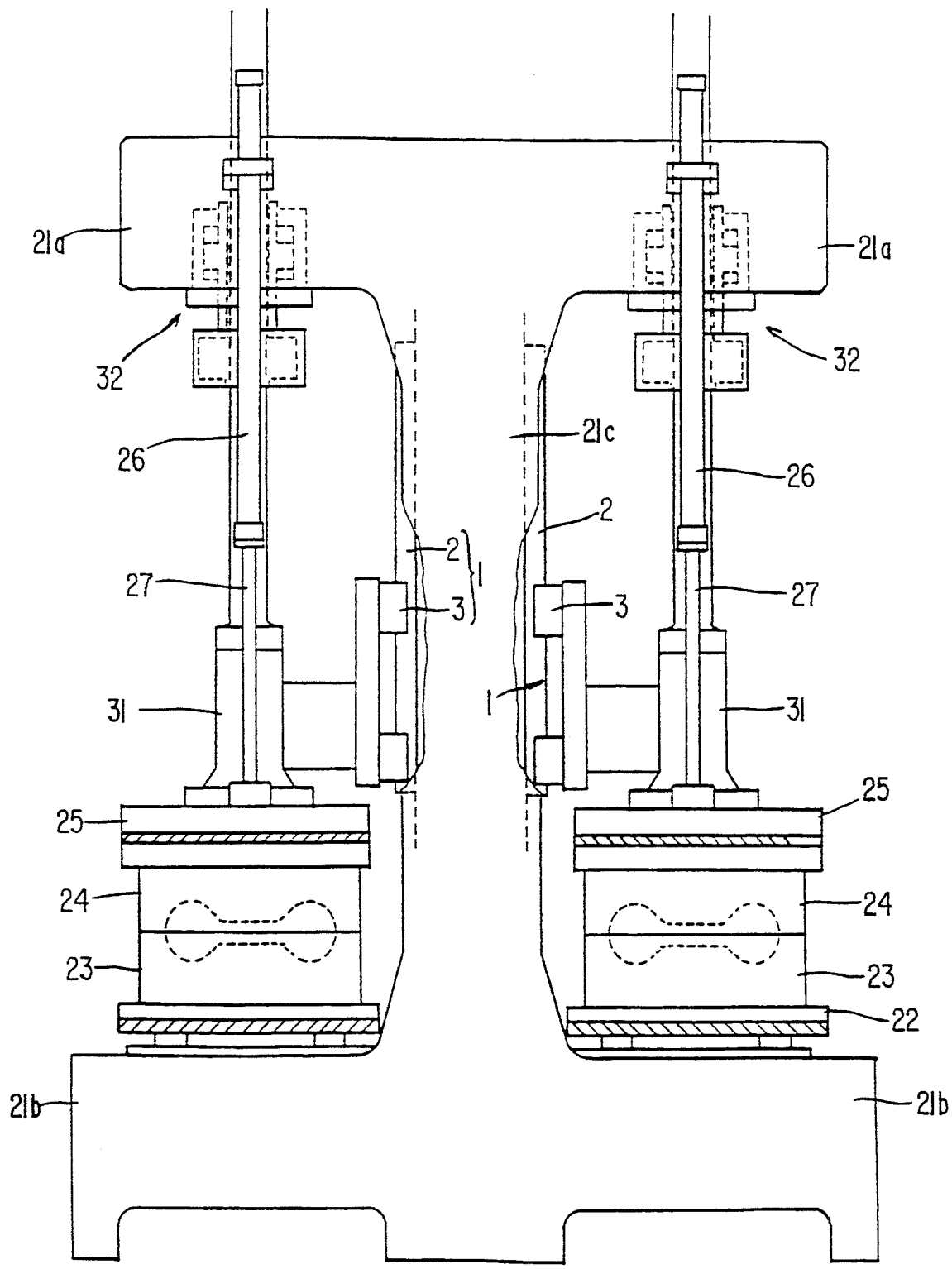
FIG. 21 is a schematic elevational view showing an eleventh embodiment of the present invention, wherein the main body frame is H-shaped.

In the tire vulcanizing press of the present invention, as shown in FIG. 20, the vulcanizing apparatus main body frame 21c is formed in the so-called C-shape. Further, as shown in FIG. 21, the vulcanizing apparatus main body frame 21 may be formed in an H-shape wherein the side frame 21c is erected between the upper frame 21a and the lower frame 21b. Thus, by making the side portion of the main body frame 21 into an opened type, it is possible to facilitate the workability in mold exchange, maintenance and the like.

Further, even in the embodiments as shown in FIGS. 7 to 21, since the guide member 1 including the moving bases 3 having the ball rows 7 rotating around their axes while revolving and the rail bases 2 has a high rigidity, it is possible that the upper mold mounting member 25 fixed with the upper mold 24 is supported on the right side frame 21c in the cantilever state, and in the cantilever state, the upper mold mounting member 25 is vertically lifted/lowered with respect to the lower mold mounting member 22. In this case, the vertical lifting/lowering of the upper mold mounting member 25 requires a high accuracy; however, since the guide member 1 can ensure the accurate linear motion, even in the lifting/lowering in the cantilever state, it is possible to sufficiently satisfy the requirement. As a result, the guide member 1 is disposed only on one side of the upper mold mounting member 25. This makes it possible to eliminate the adjustment, required in the prior art, for the parallelism between the guide members disposed in two points, that is, on both sides of the upper mold mounting member 25.

The present invention may be applied to the tire vulcanizing press of the following type, other than the above-described embodiments.

Namely, the present invention may be applied to the tire vulcanizing press of a twin type wherein two of the upper molds 24 are mounted on the upper mold mounting member 25, one set of the pressurizing frames receive the pressurizing reaction force applied in the right and left cavities. In this tire vulcanizing press, respective pressurizing frames receive the pressurizing reaction force applied in the right and left cavities.

Further, insofar as being included in the scope of the present invention, the mold pressurizing apparatus 32 may be positioned on either position. In addition, while the lower mold mounting member 22 liftably fitted in the hole of the lower frame 21b has been described; however, it may be fixed. In addition, in the case being fixed, since the pressurizing frame 55 is relatively lowered by pressurization, the gap T1 may be made in zero.

INDUSTRIAL APPLICATION

As described above, the present invention may be utilized in any tire vulcanizing press irrespective of its type.

What is claimed is:

1. A tire vulcanizing press comprising:
   a main body frame including a lower frame, and at least one side frame erected on said lower frame;
   a lower mold mounting member mounted on said lower frame for fixing a lower mold;
   an upper mold mounting member for fixing an upper mold in surface-contact with said lower mold;
   a guide member disposed on one side of said upper mold mounting member for supporting said upper mold mounting member on said side frame in a cantilever state, and which travels to be lifted/lowered; and
   a drive body for freely vertically lifting/lowering said upper mold mounting member relatively to said lower mold mounting member by traveling of said guide member;

wherein said guide member includes rail bases attached to one of said side frame or upper mold mounting member, said rail bases having a plurality of rail grooves and extending in a vertical direction, said guide member further including moving bases attached to the other of said side frame or upper mold mounting member, said moving bases being incorporated with a plurality of ball rows rotating around their axes while revolving within said rail grooves of said rail bases said vulcanizing press further comprising:

a mold pressurizing apparatus for pressurizing said upper and lower molds and vertically provided together with said upper and lower mold mounting members, wherein said upper and lower mold mounting members, said upper and lower molds, and said mold pressurizing apparatus are provided within a pressurizing frame, said pressurizing frame being operationally mounted to said side frame so as to be movable between a pressurizing position in which said pressurizing frame is vertically aligned with said upper and lower molds and said upper and lower mold mounting members for pressurizing said upper and lower molds, and an escape position in which said pressurizing frame is spaced from said upper and lower molds and said upper and lower mold mounting members.

2. A tire vulcanizing press according to claim 1, wherein said pressurizing frame comprises a plurality of steel plates having rectangular shapes which are laminated to each other.

3. A tire vulcanizing press according to claim 1, wherein said pressurizing frame comprises upper and lower yokes, and right and left disk pieces, wherein a wire is wound around each of said upper and lower yokes and each of said right and left disk pieces in horizontal and vertical directions by a plurality of turns.

4. A tire vulcanizing press according to claim 1, comprising two sets of said upper and lower molds which are freely opened/closed and are laterally juxtaposed, said pressurizing frame being movable between said two sets of said upper and lower molds.

5. A tire vulcanizing press according to claim 4, wherein said mold pressurizing apparatus is provided on said pressurizing frame, and said pressurizing frame and said mold pressurizing apparatus are provided to be movable between said two sets of said upper and lower molds.

6. A tire vulcanizing press according to claim 1, wherein said pressurizing frame comprises an upper frame portion and a lower frame portion, said lower frame portion being mounted to said mold pressurizing apparatus, wherein a first small gap is disposed between said upper frame portion and said upper mold mounting member, and a second small gap is disposed between said mold pressurizing apparatus and said lower mold mounting member.

7. A tire vulcanizing press according to claim 1, wherein said side frame comprises a bracket, said pressurizing frame being pivotally mounted at one end to said bracket of said side frame to permit a pivoting movement of said pressurizing frame between said pressurizing position and said escape position.

* * * * *